US006831659B1

(12) United States Patent
Mukoyama et al.

(10) Patent No.: US 6,831,659 B1
(45) Date of Patent: Dec. 14, 2004

(54) IMAGE PROCESSOR UNIT, GAME MACHINE, IMAGE PROCESSING METHOD, AND RECORDING MEDIUM

(75) Inventors: Toshiyuki Mukoyama, Tokyo (JP); Masako Okuda, Tokyo (JP); Tomohiro Nimura, Tokyo (JP); Tetsuichiro Hirose, Tokyo (JP); Masaki Miyashita, Tokyo (JP)

(73) Assignee: Kabushiki Kaisha Sega Enterprises, Tokyo (JP)

( * ) Notice: Subject to any disclaimer, the term of this patent is extended or adjusted under 35 U.S.C. 154(b) by 0 days.

(21) Appl. No.: 09/463,139

(22) PCT Filed: May 12, 1999

(86) PCT No.: PCT/JP99/02452

§ 371 (c)(1),
(2), (4) Date: Jul. 21, 2000

(87) PCT Pub. No.: WO99/60526

PCT Pub. Date: Nov. 25, 1999

(30) Foreign Application Priority Data

May 20, 1998 (JP) ........................................... 10-138134

(51) Int. Cl.$^7$ ............................................. G06T 13/00
(52) U.S. Cl. ....................... 345/619; 345/581; 345/582; 345/629; 345/649; 463/31
(58) Field of Search ................................ 345/619, 428, 345/589, 581, 582, 588, 493, 639, 640; 463/31

(56) References Cited

U.S. PATENT DOCUMENTS

| | | | | |
|---|---|---|---|---|
| 5,423,554 A | * | 6/1995 | Davis | 345/4 |
| 5,870,098 A | * | 2/1999 | Gardiner | 345/426 |
| 5,920,492 A | * | 7/1999 | Montag et al. | 434/226 |
| 5,947,823 A | * | 9/1999 | Nimura | 463/32 |
| 5,971,852 A | | 10/1999 | Itai et al. | |
| 6,017,272 A | * | 1/2000 | Rieder | 463/31 |
| 6,018,350 A | * | 1/2000 | Lee et al. | 345/426 |
| 6,100,895 A | * | 8/2000 | Miura et al. | 345/426 |
| 6,203,431 B1 | * | 3/2001 | Miyamoto et al. | 463/31 |
| 6,217,446 B1 | * | 4/2001 | Sanbongi et al. | 463/7 |
| 6,257,983 B1 | * | 7/2001 | Rimoto | 463/38 |
| 6,259,431 B1 | * | 7/2001 | Futatsugi et al. | 345/157 |
| 6,268,869 B1 | * | 7/2001 | Ugajin et al. | 345/428 |
| 6,278,418 B1 | * | 8/2001 | Doi | 345/156 |
| 6,317,130 B1 | * | 11/2001 | Ishikawa et al. | 345/473 |
| 6,361,438 B1 | * | 3/2002 | Morihira | 463/31 |
| 6,362,817 B1 | * | 3/2002 | Powers et al. | 345/419 |
| 6,454,652 B2 | * | 9/2002 | Miyamoto et al. | 463/31 |

FOREIGN PATENT DOCUMENTS

| | | |
|---|---|---|
| EP | 0 893 149 | 1/1999 |
| JP | 9-50541 | 2/1997 |
| JP | 9-299613 | 11/1997 |

* cited by examiner

*Primary Examiner*—Matthew Luu
*Assistant Examiner*—Daniel J Chung
(74) *Attorney, Agent, or Firm*—Finnegan, Henderson, Farabow, Garrett & Dunner, L.L.P.

(57) ABSTRACT

An image processing unit is provided that is configured so that it can display one or more objects deployed in virtual space and a character established so that it can move relative to such object or objects. A processing unit is comprised that is configured so that, when a character has met a certain condition (such as entering or leaving a building) relative to an object (the building), of the display elements configuring an object deployed in an area related to the movement of the character, the display density of at least some specific display elements (such as a wall existing in front of the building) can be gradually altered. It is possible, with such processing, to provide roll-playing games that feature a high sense of realism.

4 Claims, 20 Drawing Sheets

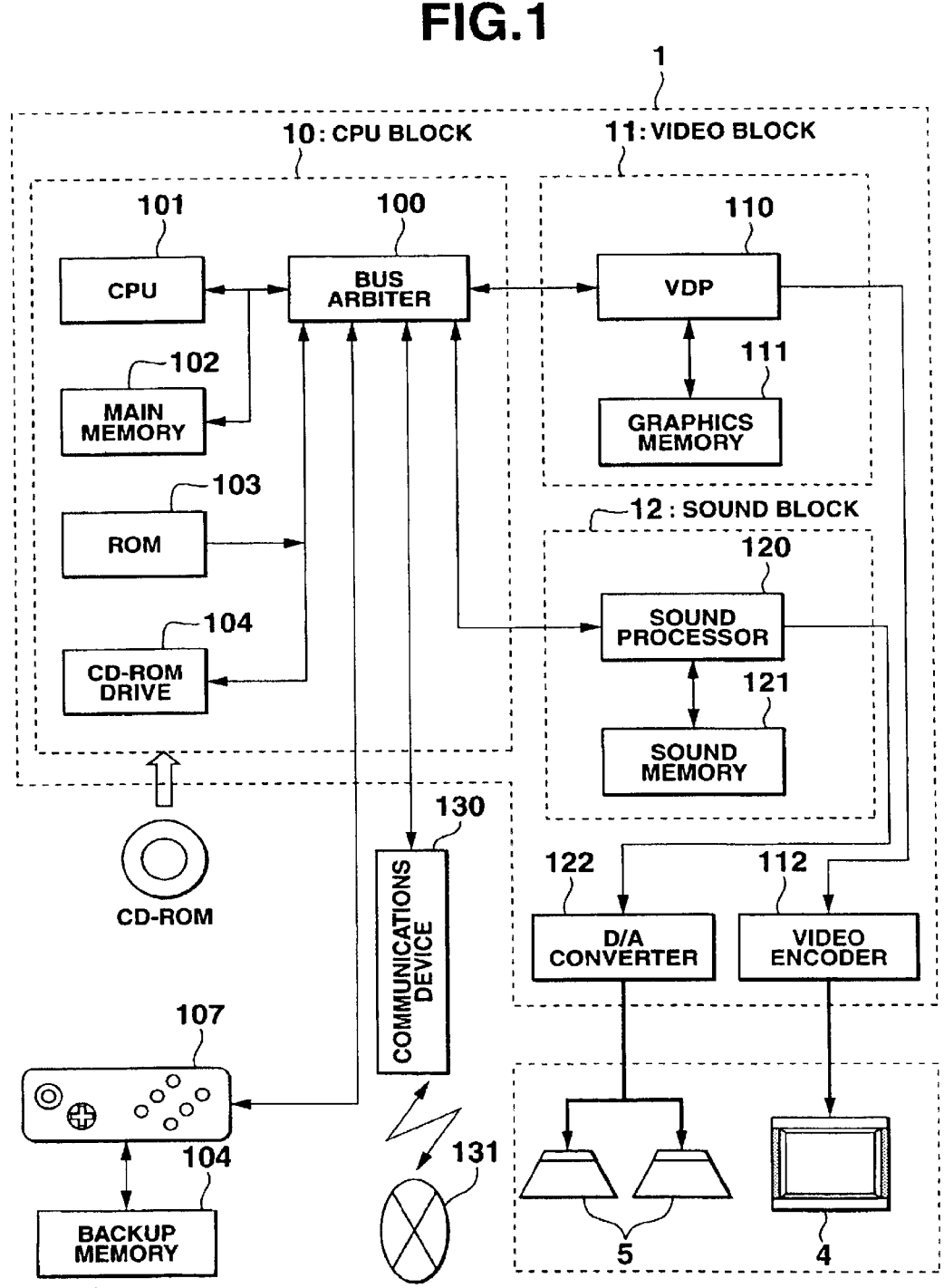

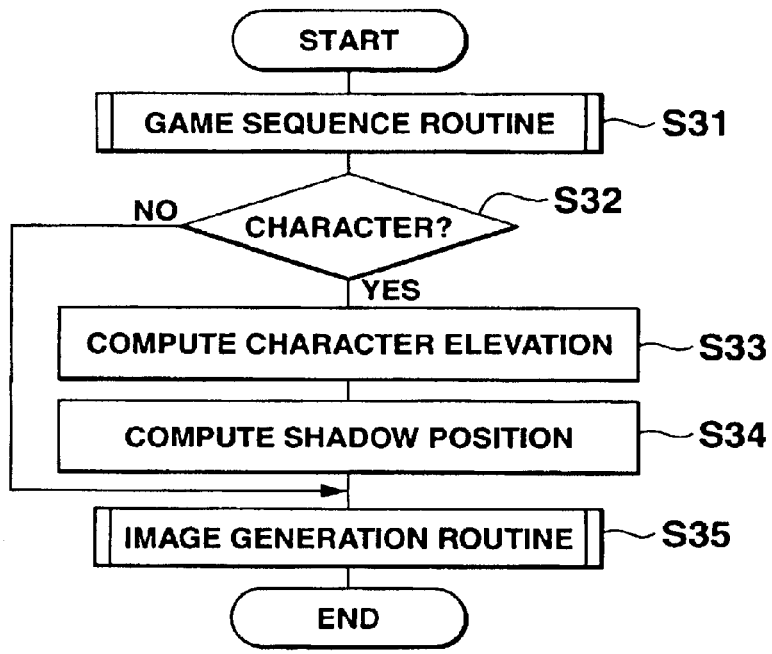
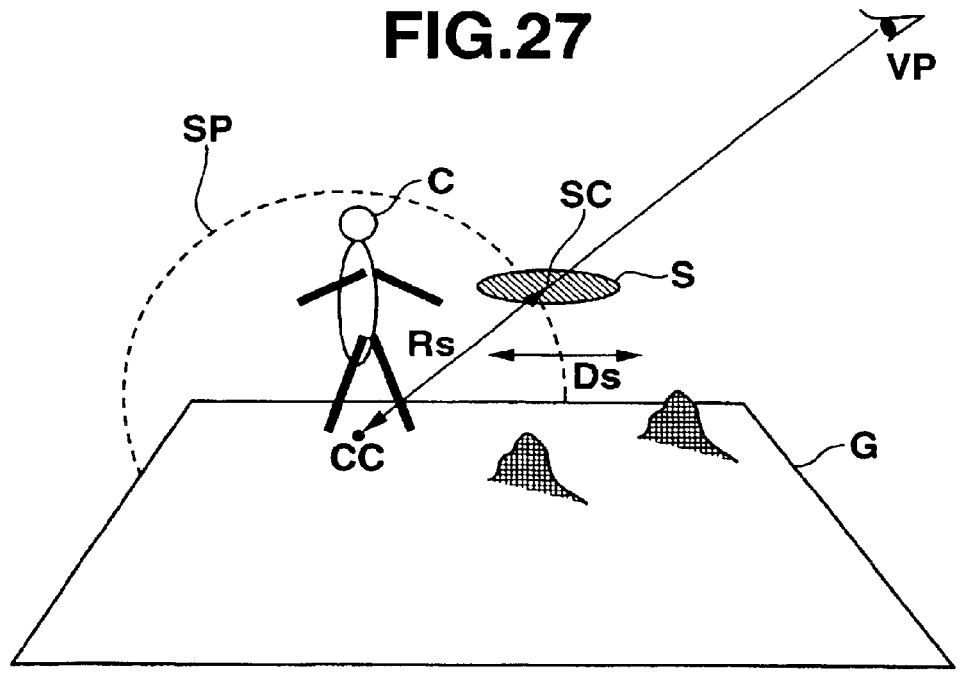

CAMERA VIEW POINT

PLANE OF SHADOW
PARALLEL TO LINE OF SIGHT

SHADOW BELOW FEET

IMAGE PROCESSOR UNIT, GAME MACHINE, IMAGE PROCESSING METHOD, AND RECORDING MEDIUM

TECHNICAL FIELD

The present invention relates to image processing technology suitable for game machines which present images in three-dimensional virtual space. More particularly, the present invention provides image processing which can pull a player deeply into a roll-playing game by realistically displaying the images displayed therein and imparting natural image changes.

BACKGROUND ART

In television game machines, roll-playing games that employ three-dimensional image processing technology are very popular because of the beauty of the imagery and the depth of the story provided. Most roll-playing games employ computer graphics technology in configurations wherein it is possible to display many displayed entities (hereinafter called "objects") in three-dimensional virtual space. These objects include, in addition to those which simulate such real-world forms as terrain, plants, animals, and buildings, those (hereinafter called "characters") which model the hero of the roll-playing game and other persons who appear in the game. In this game machine, the character corresponding to the hero is configured so that it can move in virtual space in response to manipulations of an input device by a player. This game machine, moreover, develops the game story while concomitantly moving the point of view for displaying images in virtual space so as to follow the movement of the hero character, moving the virtual space together with the characters and image-displaying objects one after another as they appear.

In a conventional roll-playing game, due to the necessity of clearly presenting the way the virtual space looks to the player, innovative measures have been implemented in the object display methods. In cases where characters enter and leave an object simulating a building, for example, either the building is made partially transparent or the object is displayed without a roof, to facilitate viewing the movements of the characters that have entered the building.

If the object simulates a tree, the texture of the entire tree is represented on flat polygons, compositions are made wherein polygons mapped with texture to represent leaves are inserted in a cruciform in the middle of the trunk, or the tree is represented by ball-shaped objects, thus mapping texture data to make [the object] look like a tree on the polygons.

In some cases realism is further enhanced by displaying shadows that follow the movement of the characters.

It is desirable, however, to design a roll-playing game so that the player becomes totally immersed in the image world presented by the game machine and becomes emotionally identified with the hero as the game progresses. When conventional roll-playing games are evaluated from this perspective, a number of difficulties become evident.

For example, in game machines where a portion of a building is removed when a character enters therein, the player engaged in the game is made to feel a sense of discord because of the unnaturalness which ensues when suddenly a portion of the building disappears or the screen changes to a display of a house interior or the like. If the building is displayed from the beginning with no roof, on the other hand, this presents anything but a realistic image, so the sense of realism cannot be enhanced.

In a roll-playing game, moreover, where a character goes is determined by player manipulations, so there are cases where an extreme approach is made to an object. If the object approached by the character is one that simulates a tree with a conventional method, however, the shapes of microscopic objects are far removed from the shape of a real tree, resulting in an image that is altogether unnatural.

Having said that, however, to try therefore to represent every individual leaf with a polygon is something that can hardly be handled by a game machine that is severely restricted in terms of machine performance and processing time.

With the conventional method for displaying shadows, moreover, a black disk-shaped object is deployed at the feet of the character and both objects are moved together to display the shadow. In cases where the terrain is uneven, however, a method involving a great computation load has been employed wherein the shadow object is floated in conjunction with the terrain in order to prevent the shadow object from sinking into the ground. The only way to lighten that computation load has been to ignore the fact when a shadow sinks into the ground. Hence it has been very difficult to display natural shadows.

DISCLOSURE OF THE INVENTION

In view of the difficulties described in the foregoing, a first object of the present invention is to provide image display that makes natural display transitions possible when a character enters or leaves an object, without losing the sense of realism.

A second object of the present invention is to provide image display wherewith, when displaying objects like trees, the shapes of the trees and the like can be displayed with a natural sense of texture even when those objects are displayed large.

A third object of the present invention is to provide image display that can display natural shadows that do not impair the sense of realism, without increasing the computation load.

A fourth object of the present invention is to provide a game machine wherewith the image processing of the present invention is possible.

A fifth object of the present invention is to provide a recording medium capable of providing a program wherewith the image processing of the present invention is possible.

An invention for realizing the first object stated above is an image processing unit or method thereof configured so that it is possible to display one or more objects deployed in virtual space and a character established that can move relative to the object or objects, configured so that, when the character meets a certain condition relative to the object, of the display elements configuring the object deployed in an area related to the movement of the character, the display density of at least some specific display elements can be gradually altered.

By "object" is meant a displayed entity, which here refers to the relationship between an object representing a character, for example, and an object representing a building that the character enters or leaves. However, this can be applied to all cases where one object enters into another object. The "certain condition" is, for example, that the character mentioned above enters or leaves the interior of the object mentioned above. This may be determined when the distance between two objects reaches a certain value, or indirectly by condition established by the progress of the game such as that "a door opened" or "a window opened." By "related area" is meant something like an area that should be established so that an object which has entered an interior is made visible by altering the display density, or an area wherein it is necessary to display an interior during the progress of the game. In the case of a building, for example, this would correspond to a self-contained area such as the first floor or the second floor, etc. The "at least some specific display elements" can be set discretionarily. For example, these could be display elements, of the display elements configuring the object mentioned earlier, positioned on the side of the point of view established in the virtual space for the purpose of generating display images. Because this is "at least some," the transparency of the entire building may be adjusted or the transparency of a specific portion thereof may be adjusted. As to the specific method of alteration, the display density for the specific display elements mentioned above would be gradually diminished when the character mentioned above enters the object mentioned above, and increased when the character leaves.

It is here desirable that a thickness be established beforehand for the partitioning members configuring the object. Thereupon, prescribed texture data are mapped to the cross-section of the partitioning members displayed by display elements other than the specific display elements mentioned earlier.

An invention for realizing the second object stated above is an image processing unit or method thereof configured so that objects deployed in three-dimensional virtual space can be displayed, being configured so that an image simulating a tree-shaped form can be displayed by deploying flat display elements, whereto prescribed texture data have been mapped, radially about a prescribed center axis so as to subtend a certain angle or angles with that center axis to configure an object, and deploying one or more such objects in the virtual space stacked up in the vertical dimension (vertical dimension established in the virtual space).

The "center axis" here refers to that portion corresponding to the trunk. In terms of the overall deployment, a cone or umbrella shape is effected. There is also no necessity that the display elements incline outwardly in the same manner. They may open upward in the coordinates of the virtual space, and the angles of opening may be made random. The term "tree-shaped form" refers, in addition to trees, to forms having indistinct shapes occurring in the natural world such as flames, smoke, and clouds, for example, and can be applied to all kinds of things.

Here, of the plurality of objects mentioned in the foregoing, those objects which cover the uppermost end are configured in roughly in umbrella shape. As to objects at lower levels, however, portions near the center axis cannot be seen, wherefore it is not absolutely necessary that texture data be mapped in close proximity to the center axis.

The configuration is also made so that adjustments are made so that display elements whereto the same texture data are mapped are not stacked on top of one another between a plurality of the objects mentioned earlier which are adjacent. In order to prevent display elements from being stacked on each other, the orientation of each object (angle of object about center axis) can be changed or the order of the display elements making up an object can be changed, object by object. Alternatively, settings may be made so that the plane of each display element protrudes out beyond the outer circumference. Or the planes of the display elements configuring the aforementioned objects may be deployed at different levels so that they do not contact each other. Or the display element planes may be arranged so that they form a delta-shaped zigzag pattern.

Another invention for realizing the second object stated above is an image processing unit or method thereof configured so that objects deployed in three-dimensional virtual space can be displayed, wherein flat display elements, whereto prescribed texture data have been mapped, are deployed in a plurality within a prescribed space area to configure one object, configured such that the directions in which the faces of the plurality of those display elements are oriented can be controlled to correspond with the point of view from which the virtual space is observed.

The "object" referred to here may suitably be a tree or other entity in the natural world having a complex shape. When the "object" is a tree, the "display elements" may suitably be a cluster of leaves configuring the tree. The main idea is to divide one tree into blocks that comprise a plurality of display elements, and effect control so that the display elements more or less face in the direction of the point of view.

One conceivable method of directional control is to establish one representative point vector for one of the objects noted above in correspondence with the point of view mentioned above, and then directionally control the display elements noted above so that a plurality of those display elements face in the direction of that representative point vector.

Another conceivable method of directional control is to directionally control the display elements noted above so that each of the normal lines in the plurality of the display elements noted above are oriented in the direction of the point of view noted above.

For example, the configuration may be made such that weighting coefficients are set to the apexes of the display elements, and the density of the texture mapped to those display elements can be linearly interpolated by those weighting coefficients between the apexes, and the configuration be made such that, by modifying the weighting coefficients so that they are made to correspond with the deployment of the object in virtual space, the density of the texture of the display elements configuring that object can be controlled.

An invention for realizing the third object stated above is an image processing unit or method thereof configured so that it is possible to display objects deployed in virtual space and the shadows of those objects, configured so that an object can be generated for displaying the shadow between the aforesaid object and the point of view for displaying the image.

The configuration is made here so that the relative positions of the object and the shadow object therefor as seen from the point of view can be altered according to the height of the object above a reference plane deployed in the virtual space. The configuration is made, for example, so that the shadow can be moved up and down on the screen in correspondence with that height.

An invention for realizing the third object stated above is an image processing unit or method thereof configured so that an object deployed in virtual space and a shadow therefor can be displayed, being configured so that a light source for shining an illuminating light for the purpose of displaying the shadow can be established in an area of a reference plane established in the virtual space wherein the shadow of the object is to be displayed. For example, a black light could be deployed at a position corresponding to the sun in the virtual space. The shining position is below the legs of the object, but the shining position may be changed according to the angle of the sun and the height of the object above the reference plane.

An invention for realizing the fourth object stated above is a game machine characterized in that it comprises an image processing unit of the present invention.

An invention for realizing trio fifth object stated above is a recording medium that is machine-readable and whereon are recorded program data for executing an image processing method of the present invention on a computer.

By recording medium is meant some thing whereon information (primarily digital data, programs) is recorded by some physical means, which is capable of causing a computer, dedicated processor, or other processing apparatus to perform prescribed functions. In other words, this recording medium may be anything which will download a program to a computer by some means and cause the prescribed functions to be executed. Such media include flexible disks, hard disks, magnetic tape, optical magnetic disks, CDs, CD-ROMs, CD-Rs, DVD-RAMs, DVD-ROMs, DVD-Rs, PDs, MDs, DCCs, ROM cartridges, RAM memory cartridges having battery backup, flash memory cartridges, and non-volatile RAM cartridges, etc.

Also included are cases where data transfer is received from a host computer via a wire or wireless communications line (public line, dedicated data line, satellite link, etc.). The so-called Internet is also included in the recording media referred to here.

BRIEF DESCRIPTION OF THE DRAWINGS

FIG. 1 is a block diagram of this game machine;

FIG. 26 is a flowchart for describing a shadow generation process in a fourth embodiment aspect;

FIG. 27 is a diagram for describing deployment when a character is in contact with the ground;

BEST MODE FOR CARRYING OUT THE INVENTION

Figure 2A:
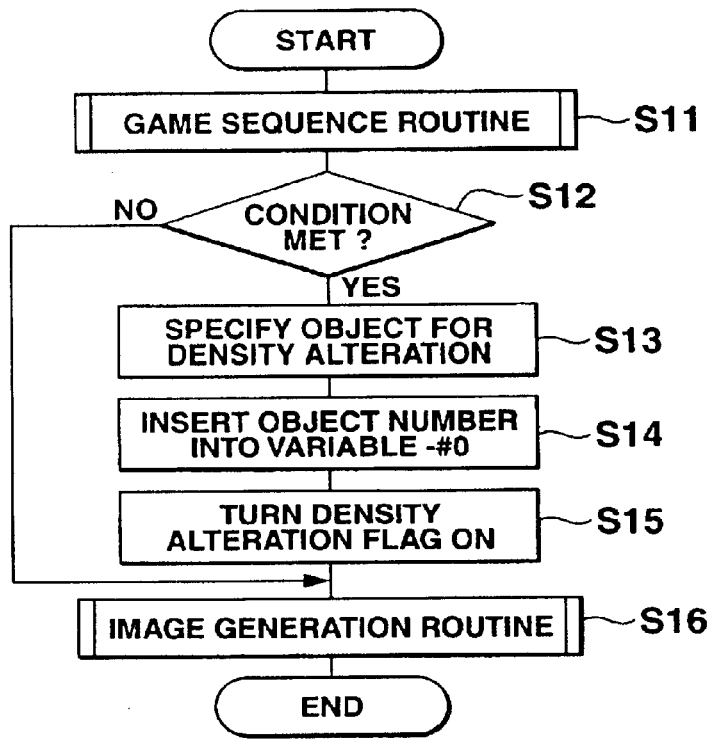
FIG. 2A is a flowchart for describing a density altering process in a first embodiment aspect, comprising a condition-met decision process.

Preferable embodiment aspects for the present invention are now described with reference to the drawings.

(Embodiment Aspect 1)

A first embodiment aspect relates to an image display device, a method therefore a game machine, and a recording medium wherewith three-dimensional image display is possible and wherewith it is possible to represent natural images when an object enters or leaves a building or the like.

(Description of Configuration)

In FIG. 1 is given a block diagram for a game machine in the present invention. The game machine 1 of the present invention comprises a CPU block 10, video block 11, and sound block 12, as diagrammed in FIG. 1, The CPU block 10 relates to a processing unit in the present invention and comprises a bus arbiter 100, CPU 101, main memory 102, ROM 103, and CD-ROM drive 104.

The bus arbiter 100 is configured so that it can control data transmission and reception by allocating dedicated bus time to the devices that are mutually connected over the bus.

The CPU 101 is configured so that it can access the CD-ROM drive 103, ROM 103, video block 11, sound block 12, and (via an input device 107) backup memory 108. When the power is turned on, the CPU 101 executes an initializing program stored in the ROM 103, initializes the overall system, and, upon detecting that a CD-ROM is loaded in the CD-ROM drive 108, transfers operating system program data stored in the CD-ROM to the main memory 102. After that, the CPU 101 is designed so that it operates in accordance with the operating system. The CPU 101 next transfers application program data stored in the CD-ROM to the main memory 102 and executes that program. The CPU 101 also transfers image data to a graphics memory 111 and is capable of transferring audio data to a sound memory 121. The processing of the program data executed by the CPU 101 mainly consists of interpreting control signals input from the input device 107 and communications data from a communications device 130, image processing made to be performed on the basis thereof by the video block 11, and audio processing made to be performed by the sound block 12.

The main memory 102 mainly stores the operating system program data and application program data noted earlier, but is also capable of providing work area for storing static variables and dynamic variables and the like. The ROM 103 is an area for storing the initializing program.

In the CD-ROM are stored program data for causing the image processing method of the present invention to be executed by this game, machine, image data for displaying images, and audio data for outputting sound. The CD-ROM drive 104 allows CD-ROMs to be loaded and unloaded. When a CD-ROM is loaded, the CD-ROM drive 104 outputs data indicating that fact to the CPU 101, and is capable of transferring data under control of the CPU 101. The recording medium is not limited to a CD-ROM, however, and other types of recording media may be configured so that they are capable of reading. The configuration may also be made so that data groups stored in the CD-ROM are transferred to the memories via the communications device 130, described subsequently. If things are set in this manner, it is possible to transfer data from hard disks in servers at remote sites.

The input device 107 is designed so that it is connected removably to this game machine, and so that control signals are output to the bus of the CPU block 10 according to the way in which control buttons are operated by the player. The input device 107 may be a joy stick or keyboard, or, alternatively, a pointing device such as a mouse or controller. Either one input device 107 may be connected, or two or more can be connected in a configuration that allows a plurality of players to play the game simultaneously.

The backup memory 108 is designed so that it can be connected removably to the input device 107, and configured so that access is possible from the CPU 101. This memory is also a storage area for game progress states and game results generated during the game and for setting data containing such settings as control methods, all of which are sent from the CPU 101. These setting data function as backup data so that if power in interrupted the game will restart from the state existing immediately prior to power interruption, and, by exchanging the backup memory, the data can be used to mirror in this game machine the control state of another game machine without changing it.

The video block 11 comprises a VDP (video display processor) 110, graphics memory 111, and video encoder 112. In the graphics memory 111 are stored image data read out from the CD-ROM as described earlier. The VDP 110 is designed so that it is capable of reading out the image data necessary for image display from the image data stored in the graphics memory 111, and performing coordinate conversion (geometry computations), texture mapping routines, display priority processing, and shading processing, etc., according to the data necessary for image display supplied by the CPU 101, that is, according to command data, point of view position data, light source position data, object designation data, object position data, texture designation data, texture density data, and field of view matrix data, etc. The configuration may also be made so that such processing as coordinate conversion, mentioned above, is performed by the CPU 101. That is, processing may be allocated to different devices according to the computing capabilities of each device. The video encoder 112 is configured so that it is capable of converting the image data generated by the VDP 110 to prescribed television signals such as in the NTSC scheme and outputting [those signals] to a monitor unit 4 connected externally.

The sound block 12 comprises a sound processor 120, sound memory 121, and D/A converter 122. In the sound memory 121 are stored audio data read out from the CD-ROM as described earlier. The sound processor 120 is designed so that, based on command data supplied from the CPU 101, it reads out audio data such as waveform data stored in the sound memory 121, performs various affect processing based on the functions of the DSP (digital signal processor), and performs digital/analog conversion processing, etc. The D/A converter 122 is configured so that it is capable of converting the audio data generated by the sound processor 120 to analog signals and outputting those to speakers 5 connected externally.

The communications device 130 is a modem or terminal adapter, for example, configured so that it can be connected to this game machine, and capable of functioning as an adapter for connecting the game machine 1 to an external line. The communications device 130, moreover, is made so that it is capable of receiving data sent from a game supply server connected to a public communications network 131 and supplying those data to the bus of the CPU block 10. There is no restriction on the public communications network 131 as to whether it comprises subscriber lines or dedicated lines, over land lines or wireless connections.

(Description of Operation)

The operation of this game machine is described next.

The roll playing game provided by the operation of this game machine is set up with a story wherein a character corresponding to a hero that can be set by the control of the player travels through a virtual world. The objects deployed in the virtual space (that is, the displayed entities predetermined by the program data and image data) include the ground and other terrain, buildings, trees, flames, clouds, and also the characters that are the hero and other persons appearing in the game. A particular objective with this game machine is to display objects in forms similar to those occurring in the natural world. To that end, settings are made so that objects and deformations that become necessary as the roll-playing game develops are portrayed as naturally as possible, so as not to hinder the concentration of the player. The image processing featured is now described.

The images provided by this game machine are images which are projected onto a prescribed two-dimensional plane so that virtual space established three-dimensionally appears to be observed from a prescribed point of view. Settings are made so that the virtual space can be moved while maintaining a more or less constant positional relationship between the position of that point of view and the character corresponding to the hero. Accordingly, to the player, images are provided that look like those which sequentially appear to the eye of the hero traveling through the virtual world.

During the game sequence, when the character corresponding to the hero enters a building, if the building display is kept unchanged, then the situation inside the building is not presented to the player because it is blocked by walls which are partitioning members, Conventionally, either that wall of the building which is on the point of view side is momentarily extinguished and displayed, or the building itself is made a building having no roof from the beginning. With such a display as this, however, the display changes suddenly or unnaturalness is imparted. Also, because the walls configuring the building have texture data mapped to one polygon, their cross-section is displayed as a single panel, which is altogether unnatural.

That being so, in this game machine, the difficulties noted in the foregoing are eliminated by displaying the wall of the building on the point of view side so that it gradually becomes thinner when a character enters the building. Also, the building walls are given thickness so that the cross-sections thereof do not look unnatural.

Figure 2B:
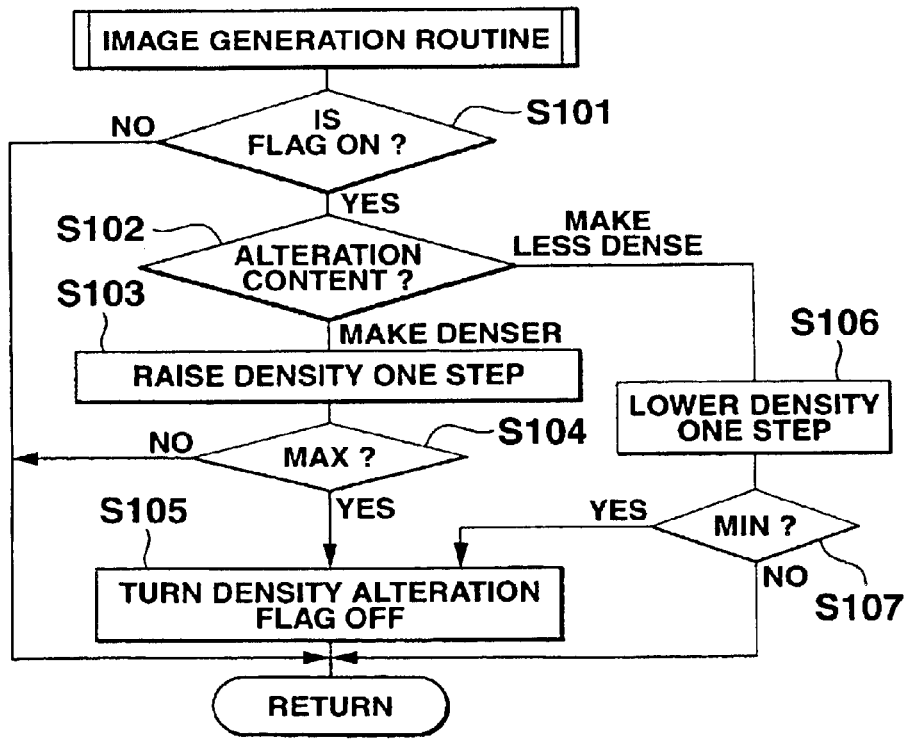
FIG. 2B is a flowchart for describing the density altering process in the first embodiment, comprising the details of an image generation process.

In FIG. 2A is given a flowchart that describes this image processing and in FIG. 2B is represented a subroutine for that image generation processing. These processes are performed with an image update timing such as, for example, once every frame period. In FIGS. 3 to 7 are given image display examples showing this image processing from start to finish.

Game sequence routine (step S11): First, the CPU 101, based on control signals supplied from the input device 107, computes a new position for a character in virtual space for the next image display time. When there are other objects beside the character for which movement is set, new positions for those are also computed.

Condition judgment (S12): Next, the CPU 101 decides whether or not the character is trying to enter a building. This condition can be conceived of in various ways. For example, it is possible to judge that the character "entered the building" the moment that the distance from the building center position to the character center position falls below a certain value. Or a known collision judgment may be performed for the building object and the character, and a judgment made that the character has entered the building when it is judged that a collision has occurred. Alternatively, the condition may be the status of an action taken by the character relative to an object inside or outside of the building, such as climbing to the top of the steps, or opening a door, or opening a window, and so on.

Figure 3:
FIG. 3 is an example image display showing the progress of density alteration (stage 1)
Figure 4:
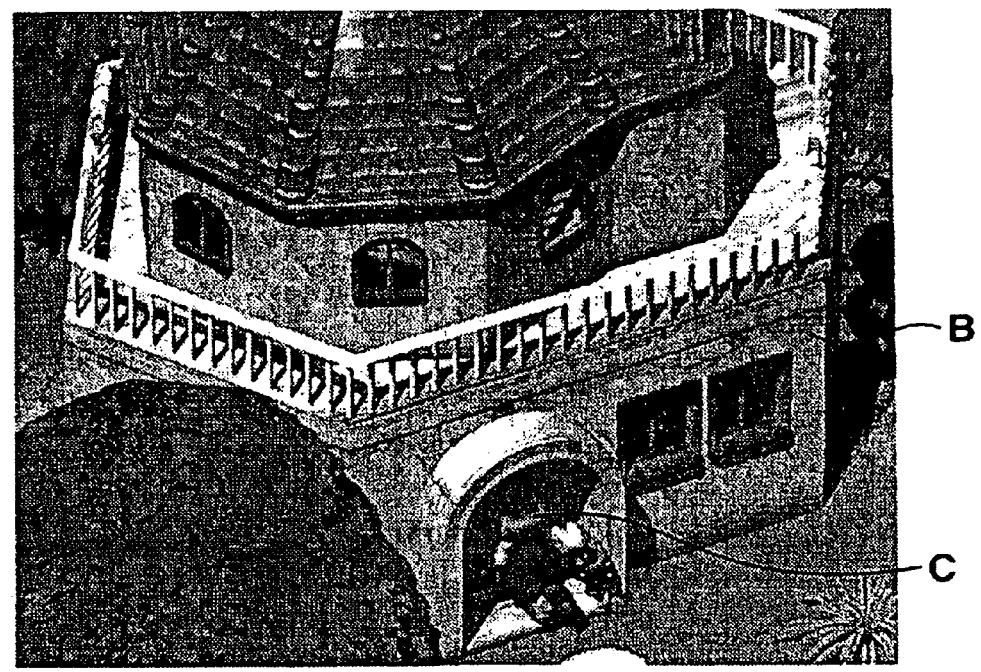
FIG. 4 is an example image display showing the progress of density alteration (stage 2)
Figure 5:
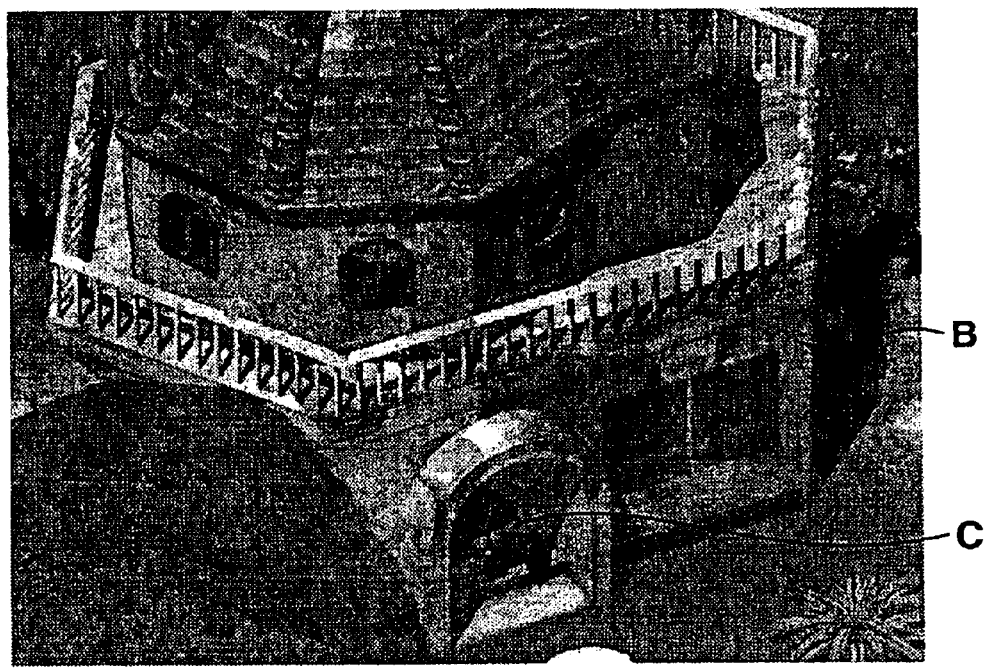
FIG. 5 is an example image display showing the progress of density alteration (stage 3)
Figure 6:
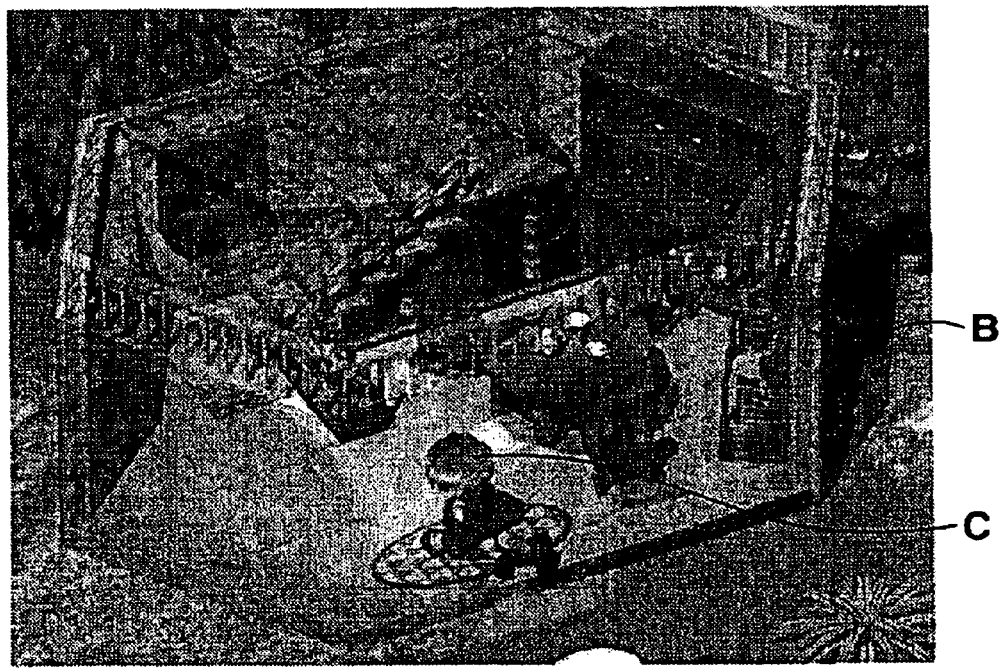
FIG. 6 is an example image display showing the progress of density alteration (stage 4)

An example of an image display when this condition is met (YES in S12) is given in FIG. 3. In FIG. 3, a building object B and character C are displayed three-dimensionally. The character C has approached the door of the building B. When this condition is not met (NO in S12), there will be no density alteration processing, and the CPU 101 performs ordinary image generation processing (S16).

Specifying objects for density alteration (S13): After the condition noted above has been met, the CPU 101 specifies an object that will have the density altered. That is, the CPU 101 determines specific display elements (polygon groups) for the building for which the density will be made thinner from the relative positions of the character and building. For example, once it is determined that the character is entering the first floor of the building, an object number designating the "first floor of the building" as an object for which the density will be altered is placed in a prescribed density alteration mode variable (stored in the higher 4 bits, for example) (S14). Alternatively, the object number may be specified from the flow of the game sequence. For example, if the building is a two-story structure and the character is entering from the outside, it may be judged that the character is entering the first floor of the building.

Specifying density alteration flag (S15): The CPU 101 then sets a flag in the density alteration mode variable according to whether the density will be altered so as to become thinner or denser (setting the value of the lower 4 bits to 1 for "make thinner," to 2 for "make denser", and to 0 for "no alteration (flag zero)," for example). When the character enters the building, it is necessary to display the front part of the building thinner to make it easy to see the interior of the building. Conversely, when the character leaves the building, it is necessary to make the texture of the front part of the building denser in order to restore the building display to what it was originally. The CPU 101, referencing the various flags that indicate game sequence states, judges what actions the character is taking or the direction of movement, and determines the density alteration mode. Then it stores a pre-established code indicating that density alteration mode together with the object number in the density alteration mode variable. When a code is set in this variable (when, for example, a value other than 0 is stored), the CPU 101 assumes that the density alteration flag is turned on. The method by which density alteration codes are assigned to variables can be designed or modified in various ways.

Image generation processing (S16): When the setting of the density alteration mode described above has been completed, the CPU 101 moves to image generation processing. No description is given here of ordinary image generation processing. The description begins from the stage where, for a building, processing is performed for mapping texture and effecting shading. First, the CPU 101 references the density alteration mode variable. If the flag is off (NO in S101), that is, if there is to be no alteration in density, the CPU 101 leaves the building texture density as it is and returns.

If the flag is on (YES in S101), that is, if the density is to be altered, the CPU 101 again references the variable code and reads out the number of the object the density whereof is to be altered and the density alteration mode. When a mode for making the density denser has been set (make denser in S102), shading processing is performed (S103) to raise the density one gradation in the texture data mapped to the polygon group (specific display elements) configuring the part of the building, on the point of view side, that is associated with that object number. The gradations determining this density can be altered variously according to the speed wherewith the density is to be altered. When the gradations are few, the alteration will be sudden, whereas when the gradations are many, the alteration will be slow. If 60 gradations are set, for example, settings can be made to complete the density alteration with 60 loop routines (approximately 1 second with the NTSC scheme). These gradations are set with a command supplied to the video block 11.

If the density alteration has proceeded to the densest gradation (that is, ordinary opaque display) (YES in S104), the density alteration flag is turned off, that is, the density alteration mode variable is zero-cleared, etc. (S105).

Figure 7:
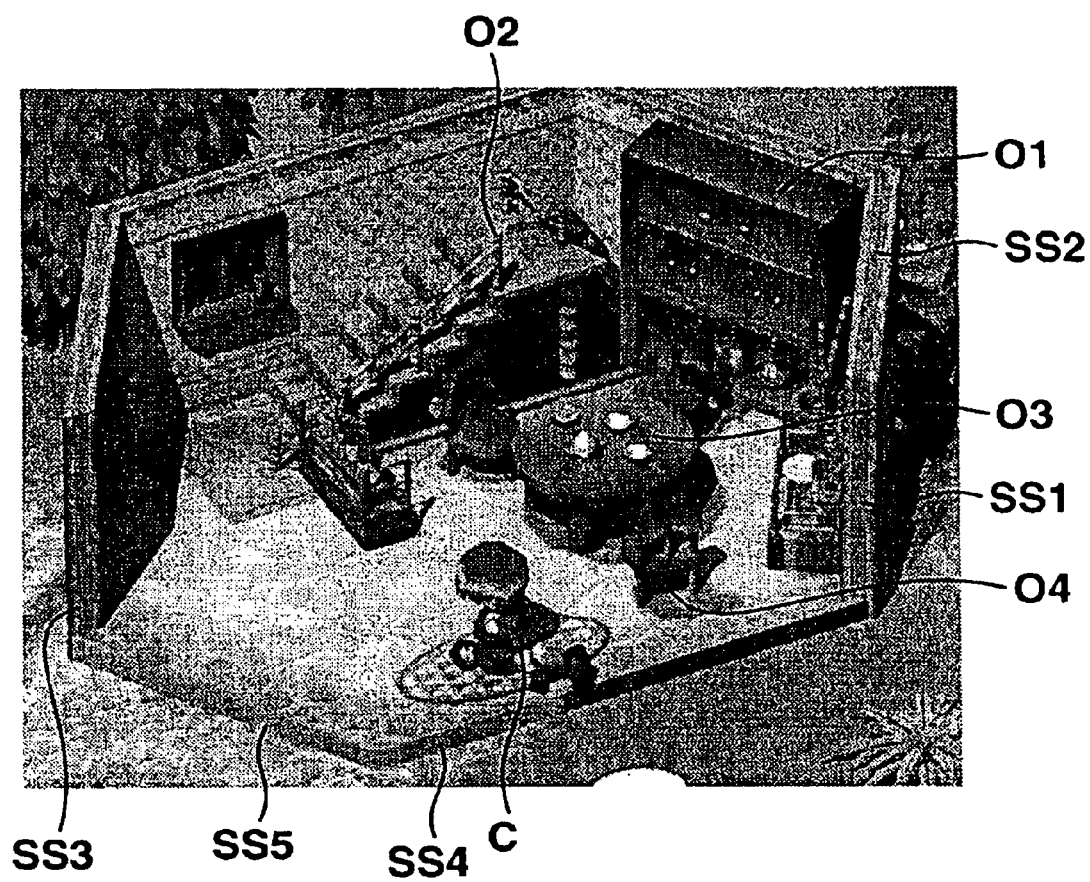
FIG. 7 is an example image display showing the progress of density alteration (stage 5)

During the course of altering the density (NO in S104), the density alteration flag will not be turned off. This course is indicated, for example, in the sequence represented in FIGS. 4 to 7. Once the character C has entered the building B, the texture density of the polygon group constituting the specific display elements in the polygons configuring the building B becomes less. Finally, the specific display elements will become completely invisible, as indicated in FIG. 7, and objects 01 to 04 deployed in the interior of the building and the character C walking through the room are displayed. As may be understood from FIG. 7, the objects displaying the furniture and interior decorations are not subjected to density alteration, and it is preferable that those be deployed along the wall as far back as possible as seen from the point of view, so that the interior situation will be easy to observe.

The walls of the building in this game machine are given thickness. Conventionally, walls had no thickness, making things look unnatural when a part of the building was eliminated. In the present invention, polygons are established to configure the exterior walls of the building and polygons are established to configure the interior walls thereof, respectively, and a certain distance is set between those two [sets of] polygons. For that reason, when the density of the specific display elements becomes thinner, as described in the foregoing, the display elements determined not to be subject to density alteration can be seen through to, and the cross-sections between the exterior walls and interior walls of the building become visible. The look will be unnatural if no texture is mapped to these cross-sections, wherefore, in this game machine, cross-section texture data are mapped between the two walls. In FIG. 7, the cross-sections SS1 to SS5 are visible. Upright wall cross-section texture data are mapped in SS1 to SS3, while floor cross-section data are mapped in SS4 and SS5. Because texture is applied to these cross-sections, no unnaturalness will arise even when the specific display elements become transparent, and the player can be given the illusion that he or she is looking at the actual building cross-sections.

Now, when the density thickening mode to set in step 102 (make thinner in S102), the processing becomes the reverse of that described above. That is, shading processing is performed (S106) to lower the density one gradation in the texture data mapped to the polygon group (specific display elements) configuring the part of the building, on the point of view side, that is associated with that object number. Then, If the density alteration has proceeded to the thinnest gradation (that is, transparent display) (YES in S107), the density alteration flag is turned off, that is, the density alteration mode variable is zero-cleared, etc. (S105). During the course of altering the density (NO in S107), the density alteration flag will not be turned off.

The processing described in the foregoing is not limited to cases of entry into or exit from a building, furthermore, and can be applied to various kinds of alterations. For example, in a case where there is a plural number of rooms in the building, object numbers can be set for each room, and control effected to increase or decrease the density room by room. In other words, in a case where a character moves from one room to another room, reaching the threshold of a room can be made the condition described earlier, the room that has been passed through can be gradually made denser and returned to what it was originally, and the density of the room about to be entered can be made gradually thinner.

If the building is a two-story structure as indicated in FIGS. 3 to 7, the condition may be made that the character is climbing the stairs (02 in FIG. 7), the density of the specific display elements set for the first floor returned to what it was originally, and the density of the specific display elements set separately for the second floor diminished. When the stairs are descended, the reverse of that is done. Based on processing such as this, walls can be naturally eliminated and restored in accordance with the progress of the character, wherefore there is no danger of interfering with the concentration of the player.

As based on this embodiment aspect, when a character enters or leaves an object such as a building, it is possible to effect natural display transitions without reducing the sense of realism of a player who is completely immersed in the game world.

(Second Embodiment Aspect)

This embodiment aspect relates to one method that makes it possible to represent objects such as trees with striking realism, without displaying unnatural images, in game machines subject to certain processing capability limitations.

The hardware used in this second embodiment aspect is the same as that indicated in the first embodiment aspect, and so is not further described here. It is assumed, however, that polygon data and texture data, etc., for facilitating the display of trees in the present invention are read into this game machine from CD-ROM. The operation is now described.

In a virtual world, if a character corresponding to a hero approaches an object (such as a tree), that object is displayed larger just as when a tree is actually approached.

With the conventional methods for displaying a tree, the texture of the overall tree is represented on one flat polygon, or a composite is made wherein polygons to which texture has been mapped to represent leaves are inserted in a cross form in the center of the trunk, or trees are represented by ball-shaped objects, mapping texture data onto the polygons to effect a treelike look. Hence, when the point of view approaches the tree, the leaves are displayed as panels, resulting in an un-treelike representation.

In contrast thereto, in this game machine, objects (umbrella-shaped, for example) are configured wherein flat display elements to which texture data have been mapped are deployed radially about a center axis so as to subtend a certain angle with that center axis. Then one or more of these umbrella-shaped objects are positioned in virtual space so that they are stacked up, thereby making it possible to present a treelike image even when approached.

Figure 8A:
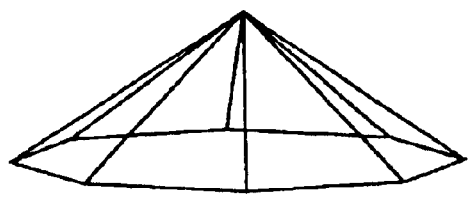
FIG. 8A is a diagonal view of an example object that represents a tree in a wire frame representation.
Figure 8B:
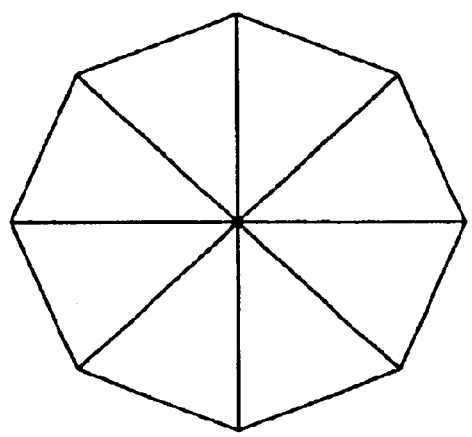
FIG. 8B is a plan of the example object that represents a tree in a wire frame representation.

In FIG. 8, one umbrella-shaped object of the tree objects presented in this game machine is shown in a wire frame representation. FIG. 8A is a diagonal view thereof while FIG. 8B is a plan thereof. In FIG. 8, the umbrella-shaped object is configured as an octagon using eight triangular polygons, but the number and shape of the polygons is not limited thereto. It becomes possible to make treelike representations by mapping texture data consisting of dots having subtly different densities or hues to these polygons, respectively. If all of the polygons are made to face downward, that is, to form an umbrella shape, the semblance of a cedar or other evergreen can be effected, and if the polygons are deployed randomly with some facing upward and some downward, the semblance of a broadleaf tree can be effected.

Figure 9:
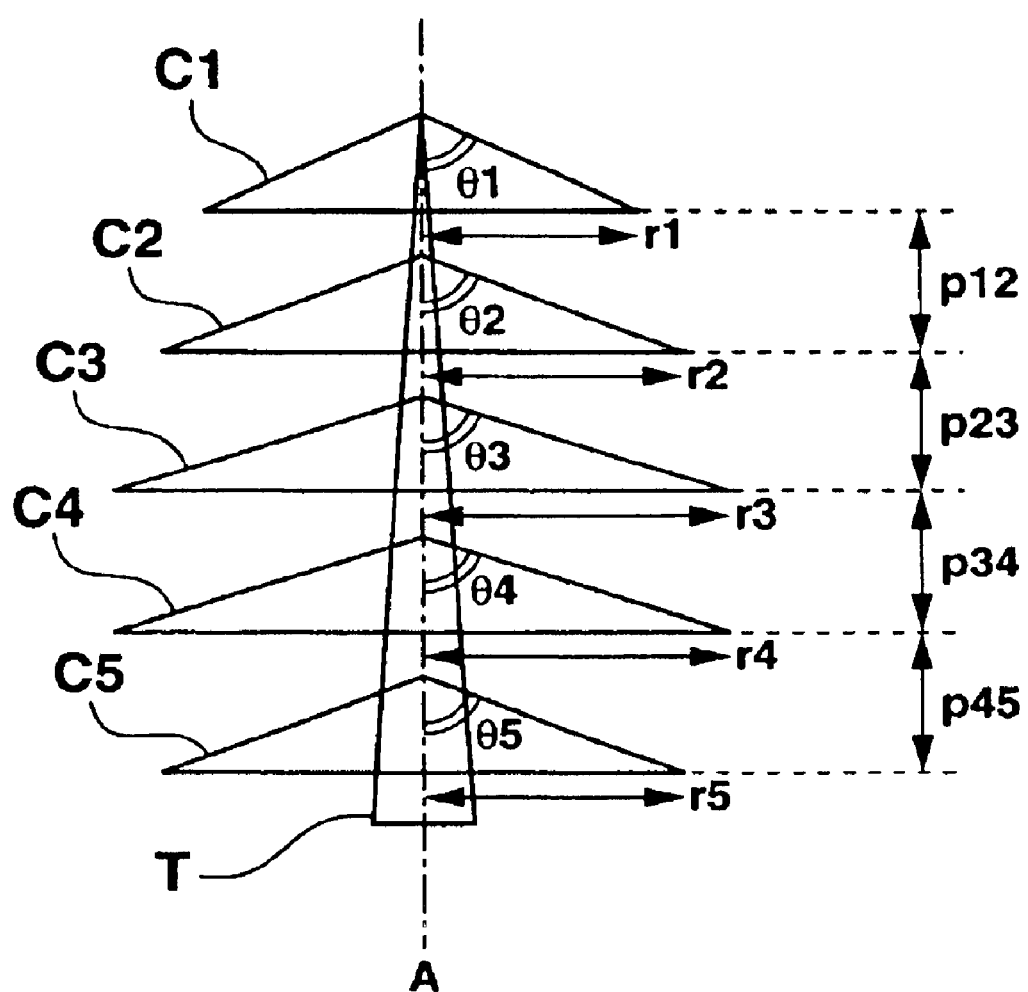
FIG. 9 is a configuration diagram of a tree object in a second embodiment aspect.

FIG. 9 is a diagram for describing a tree object using five of the umbrella-shaped objects described above (C1 to C5). This tree object is configured by deploying the umbrella-shaped objects C1 to C5 about the trunk object T that surrounds the center axis A. The angles subtended by the polygons configuring the umbrella-shaped objects C1 to C5 and the center axis A may all be the same or they may be different. The same is true of the radii r1 to r5 of the umbrella-shaped objects and the pitches p12, p23, p34, and p45 between the umbrella-shaped objects. It is possible to display very realistic images by making the number of umbrella-shaped objects greater and the pitch p smaller, but that results also in increased data volume and processing time. Accordingly, these are determined according to the memory capacity and processing power.

Figure 10:
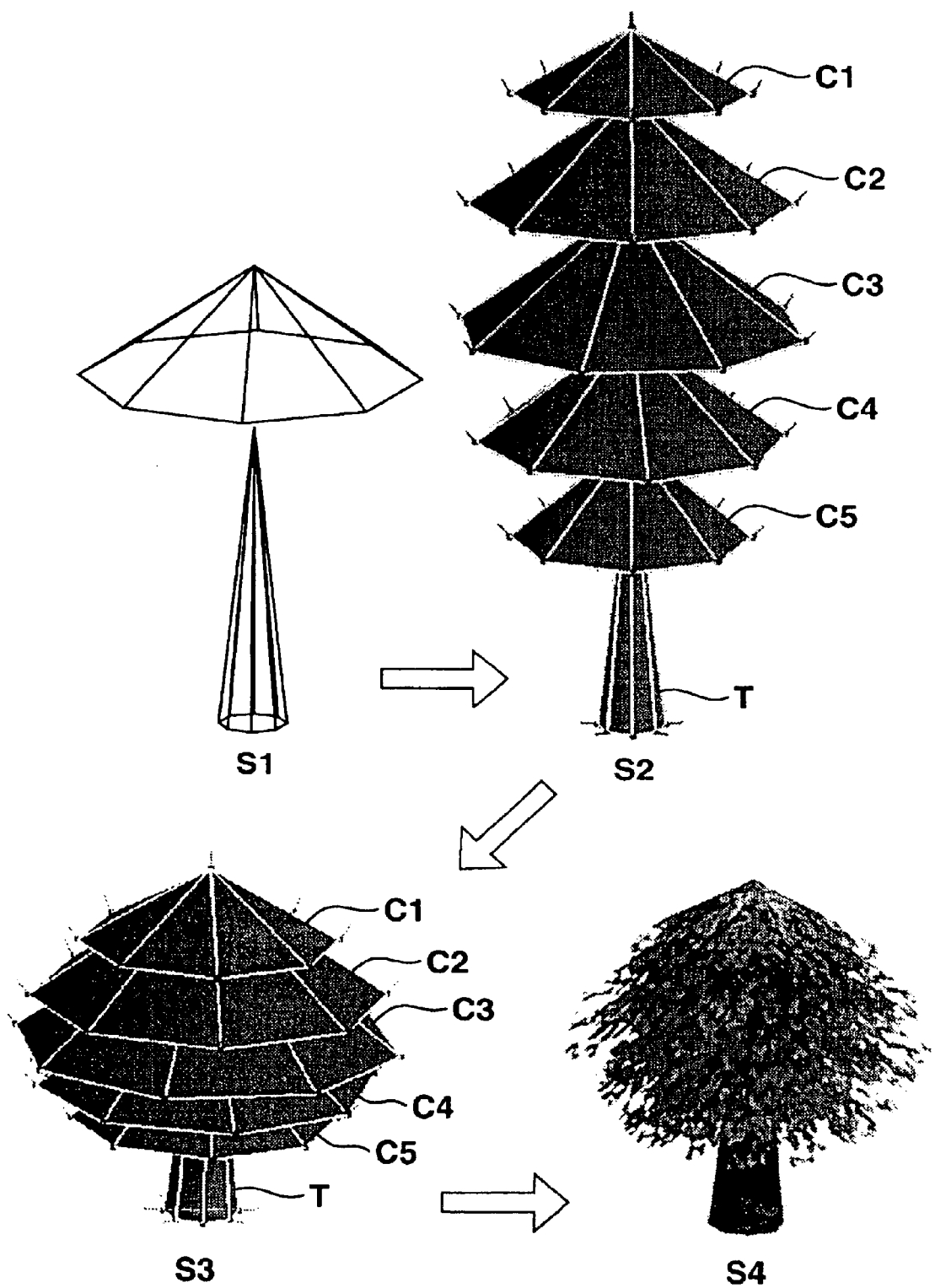
FIG. 10 is a diagram for describing a procedure for image-generating a tree object.

In specific terms, the image generation procedures are as diagrammed in FIG. 10. In the image generation process described earlier (FIG. 2A, step S16), the CPU 101, in parallel with other object image generation, first specifies polygons and determines a polygon data group for displaying the objects (S1). Thus the polygons to be used are specified. Next, the CPU 101 sends object designation data indicating matrix data that determine the specified polygons and their size to the video block 11. Thus the shapes of each of the objects used are determined (S2). The CPU 101 also sends object position data that determine the spatial positioning of the umbrella-shaped objects and trunk object to the video block. Thus the tree shapes other than texture are determined (S3). Finally, texture designation data for designating the texture to be mapped to the polygons configuring the umbrella-shaped objects and trunk object are sent. In the video block 11, those texture data are mapped and the tree object is finished. This object is field-of-view converted and image-displayed (S4).

Figure 11:
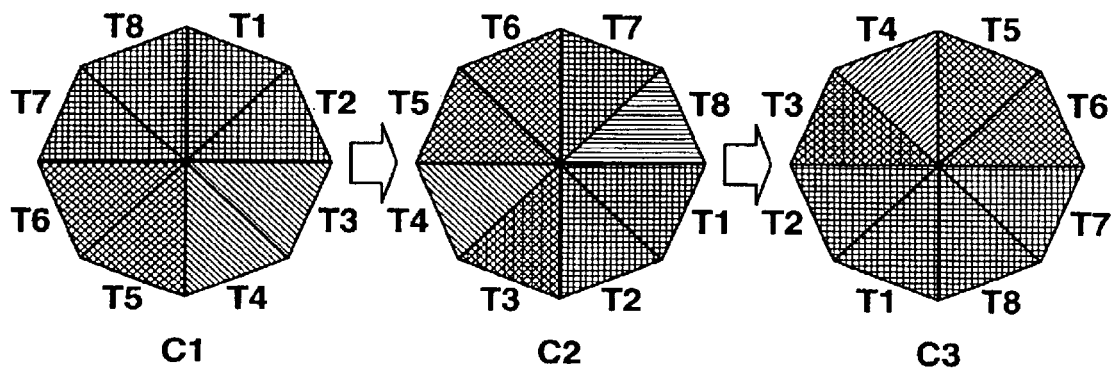
FIG. 11 is an example deformation (the first) in an umbrella-shaped object.

The umbrella-shaped objects described above can be altered in various ways. For example, as diagrammed in FIG. 11, when the arrangement of the textures T1 to T8 deployed in the umbrella-shaped object is set commonly to all umbrella-shaped objects, it is possible to shift the positioning wherewith the texture is mapped in the order C1, C2, C3, and so on. When this is done, the identical texture will not be stacked up vertically even when mapping the same texture to the umbrella-shaped objects, making it possible to present the semblance of a natural tree.

Figure 12:
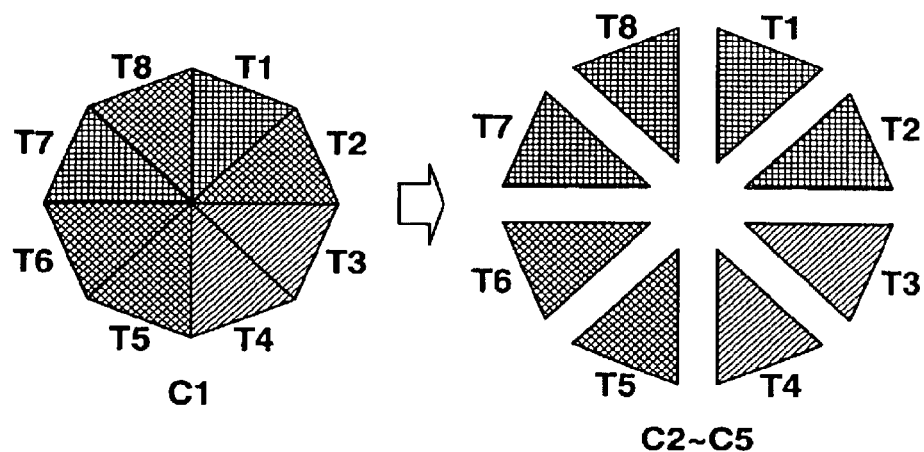
FIG. 12 is an example deformation (the second) in an umbrella-shaped object.

As diagrammed in FIG. 12, furthermore, by shifting the polygons on the outer circumferential sides in the umbrella-shaped objects C2 to C5, that is, in all except the uppermost umbrella-shaped object C1, it is easy to make the umbrella diameter larger. By not needing to alter the size of the polygons it is possible to reduce computation time.

Figure 13:
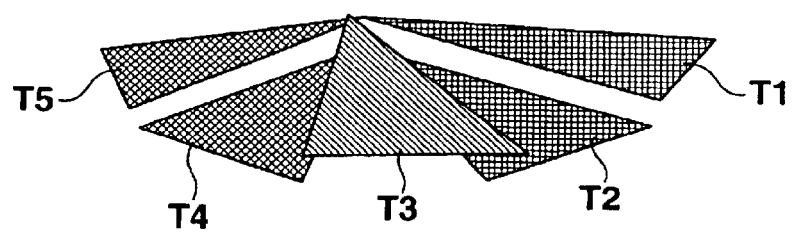
FIG. 13 is an example deformation (the third) in an umbrella-shaped object.

It is also possible, as diagrammed in FIG. 13, to deploy the polygons configuring the umbrella-shaped object so that they are shifted up and down so that they do not touch each other. When this is done, the tree leaves overlap in multiple layers, making it possible to present a more natural tree semblance. Alternatively, the deployment may be made so that the object is fan-shaped with staggered cross-sections.

This description of this embodiment aspect pertains to the representation of a tree, but the objects to which this description can be applied are not limited to trees. It is possible to apply this description to all kinds of objects which have complex shapes, which therefore require an enormous number of routines to faithfully reproduce, and which, if represented with simple texture, end up as unnatural displays when approached.

As based on this second embodiment aspect, a benefit is gained in that objects such as trees can be displayed with a natural semblance even when they are approached by a character, so that the player's sense of realism is not compromised.

(Third Embodiment Aspect)

This embodiment aspect relates to another method which makes it possible to represent highly realistic trees as in the second embodiment aspect.

The hardware used in this third embodiment aspect is the same as that indicated in the first embodiment aspect, and so is not further described here. It is assumed, however, that a program, polygon data, and texture data, etc., for facilitating the display of trees in the present invention are read into this game machine from CD-ROM. The operation is now described.

Whereas in the second embodiment aspect described above the shapes of display elements for representing clusters of leaves for representing a tree object are drawn as special shapes, in this third embodiment aspect, flat display elements to which texture has been mapped to represent leaf clusters are deployed in a plurality within a specific spatial area about the trunk to configure one object.

Figure 14:
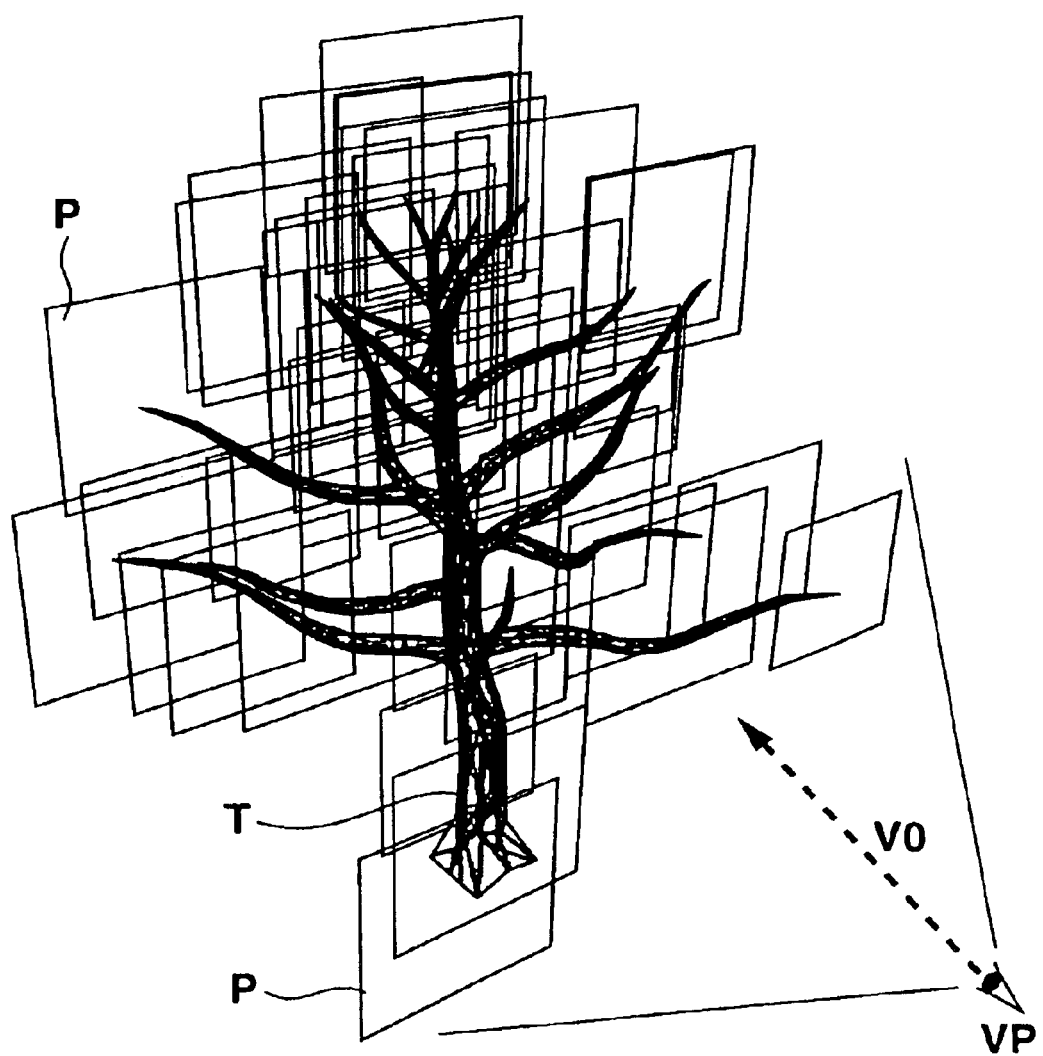
FIG. 14 is a configuration diagram of a tree object in a third embodiment aspect.

In FIG. 14 is given a diagonal view showing a tree object in this embodiment aspect represented as a wire frame. As diagrammed in FIG. 14, the tree object is configured as a display element T that represents the trunk and a plurality of display elements P that represent clusters of leaves.

The display element T representing the trunk is configured by a plurality of polygons in the spatial shape of a tree. Each of the display elements P representing a leaf cluster consists of a single polygon made upon a respectively prescribed number (4, for example) of apexes. The display elements P are suitably deployed in the spatial area around the display element T representing the trunk. The deployment of the display element P is determined beforehand so that the overlaps of the display element P become few as viewed from positions in the virtual space where the point of view mainly exists. Such tree object image data are stored beforehand in the CD-ROM, etc.

Figure 15:
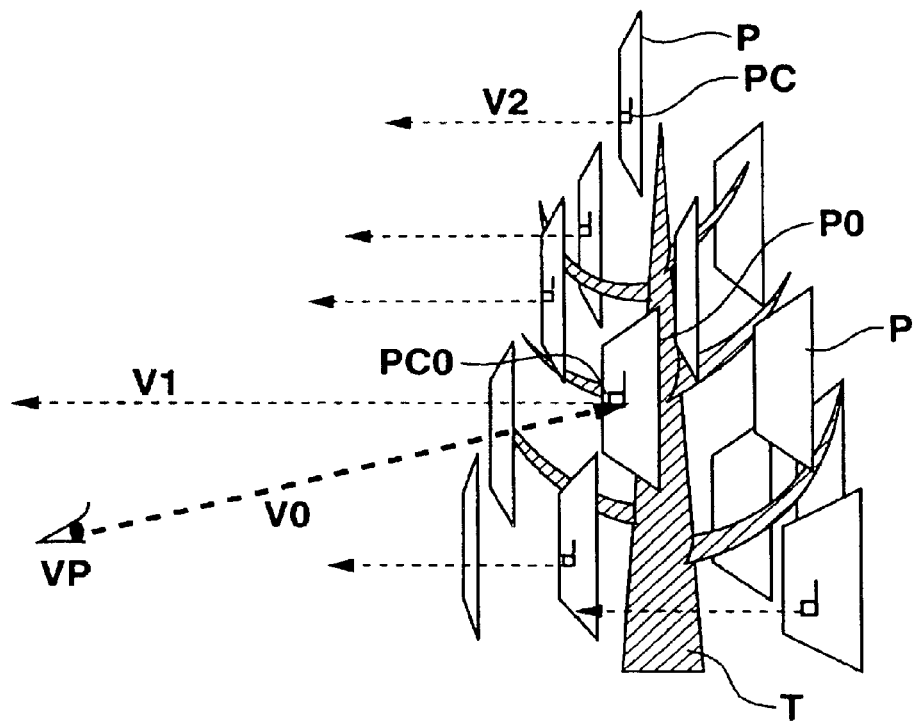
FIG. 15 is a diagram for describing the directional control of display elements (polygons) in the third embodiment aspect.

In FIG. 15 is given a diagram for describing the directional control method in this embodiment aspect.

Directional control is effected in this embodiment aspect, as diagrammed in FIG. 15, by establishing one representative point vector V1 for each tree object in association with the point of view VP, and controlling the direction of each display element P so that the plurality of display elements P configuring that object faces in the direction of the representative point vector V1. In other words, the directions in which the planes of each of the plurality of display elements face are altered dynamically and uniformly in correspondence with the direction V0 of the point of view VP, and controlled so that they always face in the same direction.

The representative point vector V1 is established at any one point on the tree object. That any one point need not be established on a display element P or T, but here is established on the specific display element P0. In whatever direction the specific display element P0 faces, the other display elements P will also face in that same direction, wherefore it is preferable that a display element P near the center of the tree object be made the specific display element P0.

It is also preferable that the representative point vector V1 be established in the same direction as the line of sight vector V0, that is, in the Z-axis dimension of field of view conversion. The reason for this is that, if it is done, the specific display element P will always face in the direction of the point of view P, and the other display elements P will also face more or less in the direction of the point of view VP.

Figure 16:
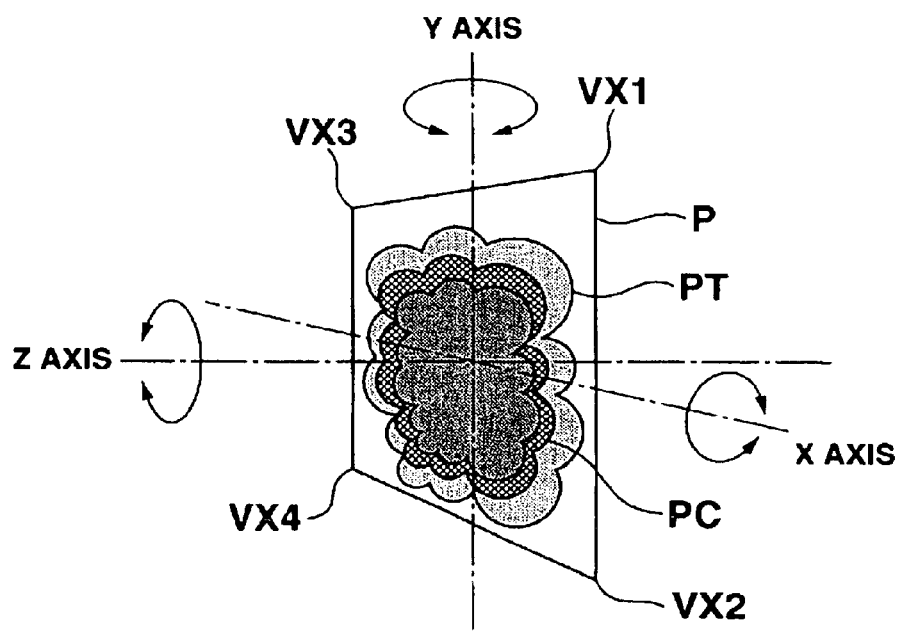
FIG. 16 is a diagram for describing the control of one display element (polygon)

In FIG. 16 is given an enlarged view of a display element P representing a leaf cluster. The display element P has a square shape, for example, which is defined by coordinates for the apexes VX1 to VX4. There is no limitation on the number of apexes, but it is sufficient to provide 3 or 4. Each display element P can be rotated in any manner about the three rotational axes X, Y, and Z that intersect at the center point (center of gravity) thereof. More specifically, in the case of deploying a display element P that is defined in a body coordinate system in a world coordinate system, it is positioned by rotating it a determined rotational angle about each of the axes X, Y, and Z. Thus each display element P is configured so that it is possible to orient the normal direction thereof in any direction, and the display elements P can always be directionally controlled according to the position of the point of view.

The same texture data PT are mapped inside each display element P. If surplus memory is available, a number of types of texture data may be provided. However, because it is possible to represent adequate semblance by the linear interpolation of brightness (density) values, one type is sufficient. Even when the same texture data are used, however, it is preferable that the direction of mapping be altered randomly for every display element P. If such a technique as this is adopted, the leaf clusters will be displayed in different shapes, making it therefore possible to represent extremely natural trees even though identically shaped texture data are used.

To each apex configuring a display element P is set a weighting coefficient for defining the linear interpolation of the brightness. This value may be set as desired. If it is restricted to the range of 0 to 1, for example, it is assumed that the brightness is zero (that is, black on the display) when that value is 0,and 100% (that is, white on the display) when that value is 1. The processing unit is configured so that, when mapping texture to one display element P, the brightness of the texture mapped to that display element P can be linearly interpolated by the weighting coefficients for each apex. If, for example, a weighting coefficient of 1 is set to one apex on the display element and a weighting coefficient of 0 is set to another apex, between these two apexes, the texture will be displayed with a graduation such that the brightness gradually falls from bright to dark from the one apex to the other.

Figure 17A:
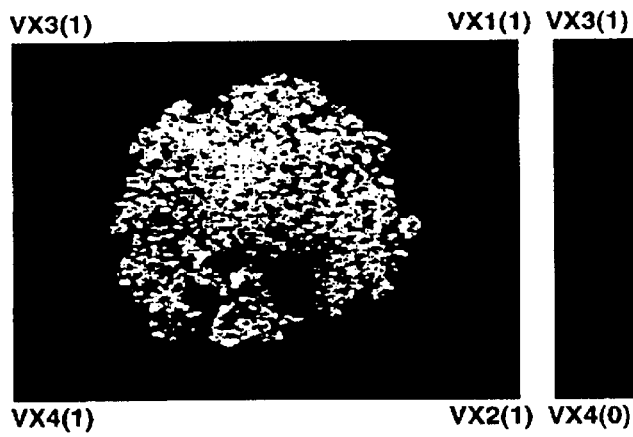
FIG. 17A is a texture display diagram for a case where the same weighting coefficient is set to the apexes of a display element.
Figure 17B:
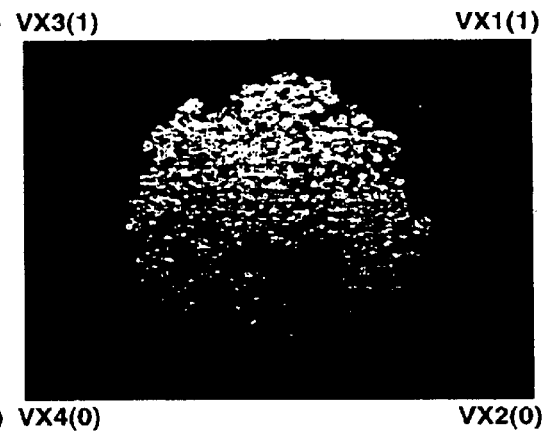
FIG. 17B is a texture display diagram for a case where the same weighting coefficient is set to the apexes of a display element.

In FIG. 17A is shown an example of texture mapping when the weighting coefficients of all of the apexes are set at 1, and in FIG. 17B is shown an example of texture mapping when the weighting coefficients of apexes in opposing sides are changed. When the same weighting coefficient is set to all of the apexes, as shown in FIG. 17A, the display is flat with no differences in brightness. Conversely, when the weighting coefficients of apexes are changed, a difference in brightness appears as though sunlight were shining from one direction, resulting in a three-dimensional look.

Figure 18:
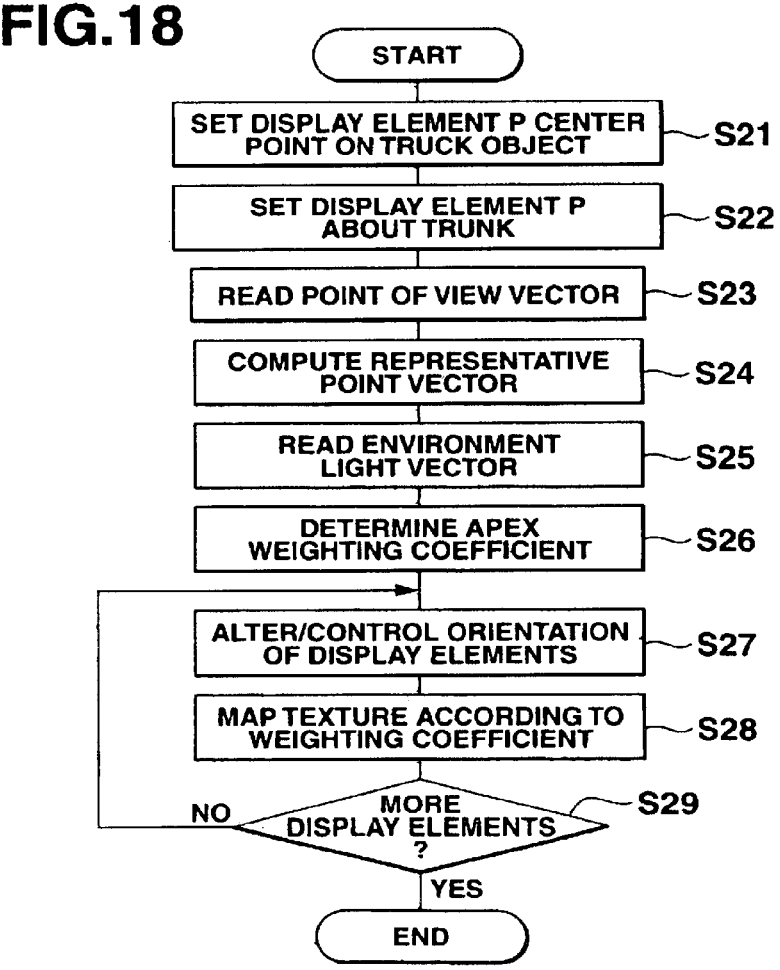
FIG. 18 is a flowchart for describing the directional control of a tree object in the third embodiment aspect.

The operation of this embodiment aspect is now described with reference to the flowchart given in FIG. 18.

When it is necessary to display a tree object in virtual space, the CPU 101, in order to generate a display element T for representing the trunk read out from the CD-ROM, generates a trunk display element with a polygon group associated therewith. The CPU 101 also establishes the position of the center (center of gravity) of the display elements P about the trunk display element T (S21). After reading the polygons for the display element P, the CPU 101 deploys the polygons for the display element P in the position of the center of the display element P established earlier (S22).

After acquiring the point of view vector V0 from the point of view VP (S23), the CPU 101 computes the representative point vector V1 (S24). The point of view vector V0 oriented toward the specific display element P0 on the tree object may be used as is for the representative point vector V1.

In order to set the texture mapping density, the CPU 101, reads an environment light vector (S25), and recognizes the primary illumination direction relative to the tree object. The CPU 101 then determines the weighting coefficients to be set to the apexes of each display apparatus P in correspondence with the recognized environment light vector (S26). These settings are made so that the weighting coefficients nearer in the direction toward the environment lighting are higher and those farther are lower. The density (brightness) settings are not exact, wherefore it is possible to make simple allocations, such as making the weighting coefficients of apexes closest to the environment lighting 1, the weighting coefficients farthest therefrom 0, and the weighting coefficients intermediate therebetween 0.5. It is permissible, however, to determine the weighting coefficients by linear computations from the intensity of the environment lighting and the positional relationship between the environmental lighting and the apexes. Different weighting coefficients may be set for each display element P, but since the environment lighting affects the entire tree object uniformly, it will be sufficient if the weighting coefficient set for one display element P is set the same for all of the other display elements P.

For each of the display elements P deployed on the tree object, the CPU 1 orients the polygons so that they face in the direction of the representative point vector V1 determined earlier (S27). The CPU 101 also maps texture data PT to the directionally controlled display elements P (S28). When that is done, the texture brightness is linearly interpolated according to the apex weighting coefficients determined as described above, and bit map data are created so that density variation (brightness variation) is produced.

The CPU 101 performs direction control (S27) and texture mapping (S28) so long as polygons that are display elements P exist (NO in S29). When the direction control and texture mapping has been completed for all polygons (YES in S29), the CPU 101 moves to the next processing routine.

(Embodiments)

Figure 19:
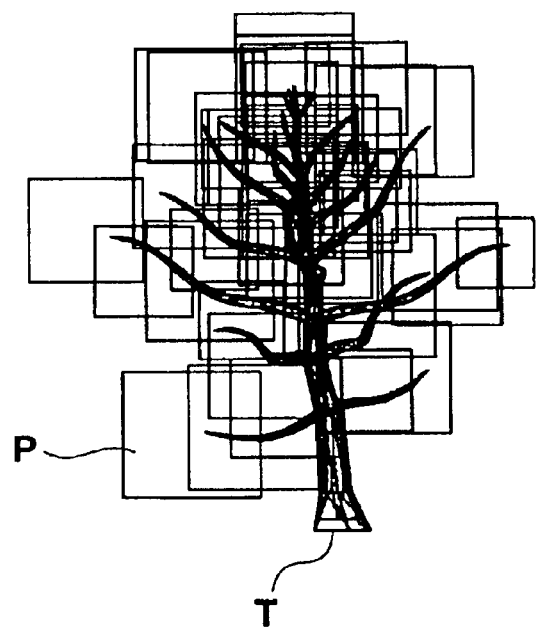
FIG. 19 is a wire frame configuration diagram (side view) of a directionally controlled tree object.

By this embodiment aspect is represented an embodiment in a case where tree objects are actually drawn. In FIG. 19 is shown a wire frame representation in a case where the deployment of a tree object is determined, from the side. Display elements P representing leaf clusters are deployed so as to be scattered about a display element T representing the trunk. In this embodiment, 44 display elements P are deployed.

Figure 20:
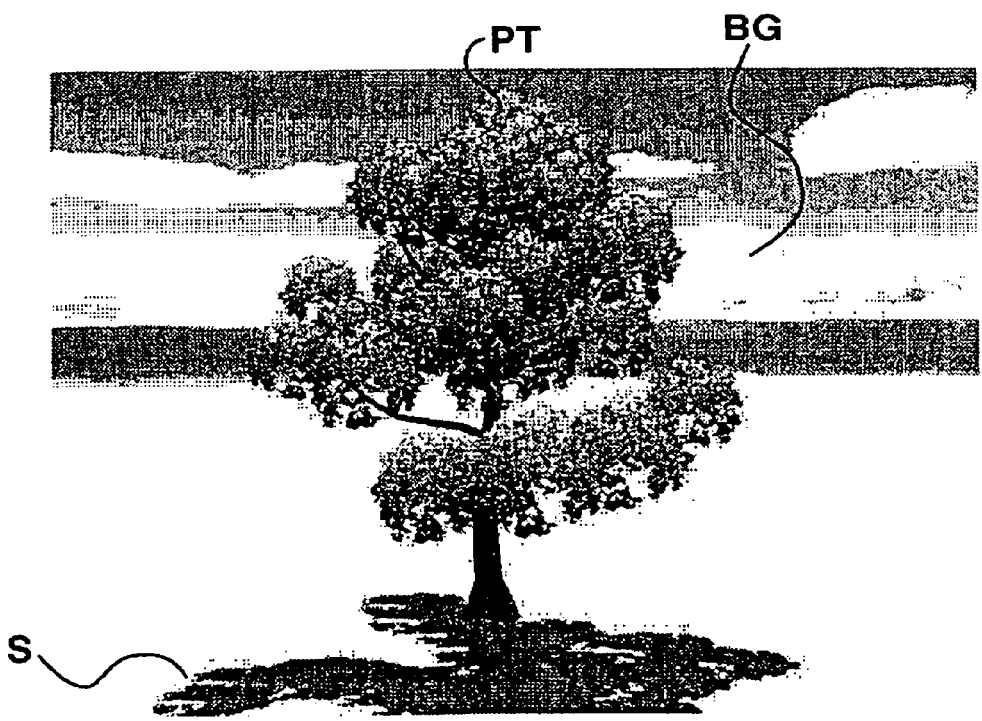
FIG. 20 is an example display (side view) wherein texture has been mapped to a directionally controlled tree object.

In FIG. 20 is shown a display example wherein texture has been mapped to the tree object determined in FIG. 19. In this example, the weighting coefficients for the display elements P are set with the presumption that the environment light is directed from above in the drawing (cf. FIG. 17B). A background image BG is displayed so that it can be seen through to in those portions of the texture data mapped to the display elements P having no data. A shadow object S is displayed below the tree object. This shadow is like that which is displayed in an embodiment aspect that will be described subsequently.

Figure 21:
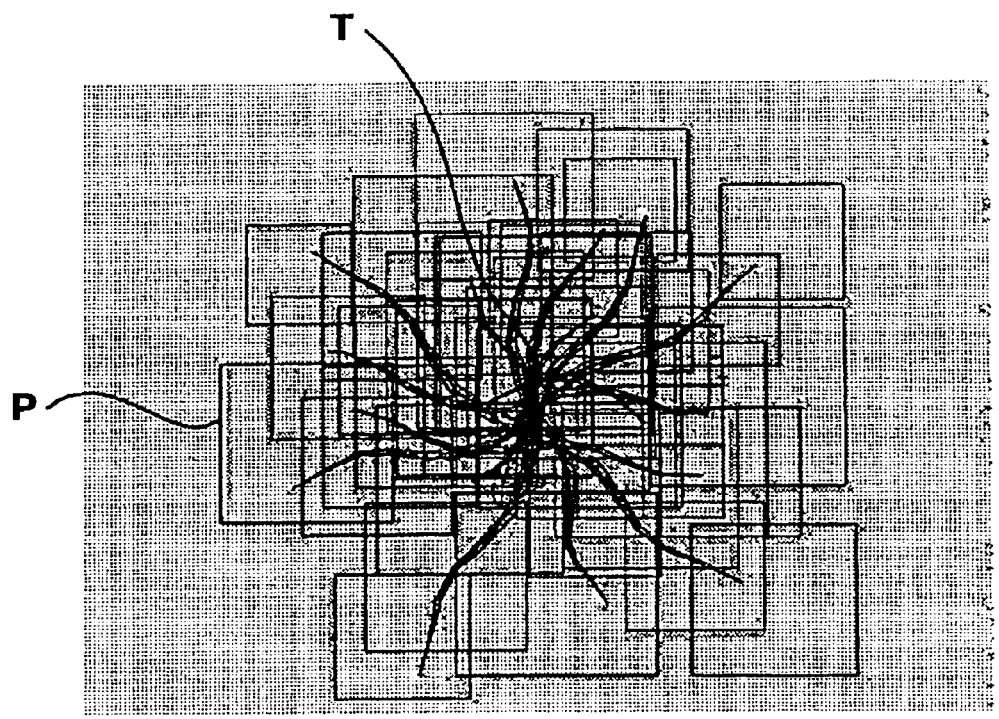
FIG. 21 is a wire frame configuration diagram (plan) of a directionally controlled tree object.
Figure 22:
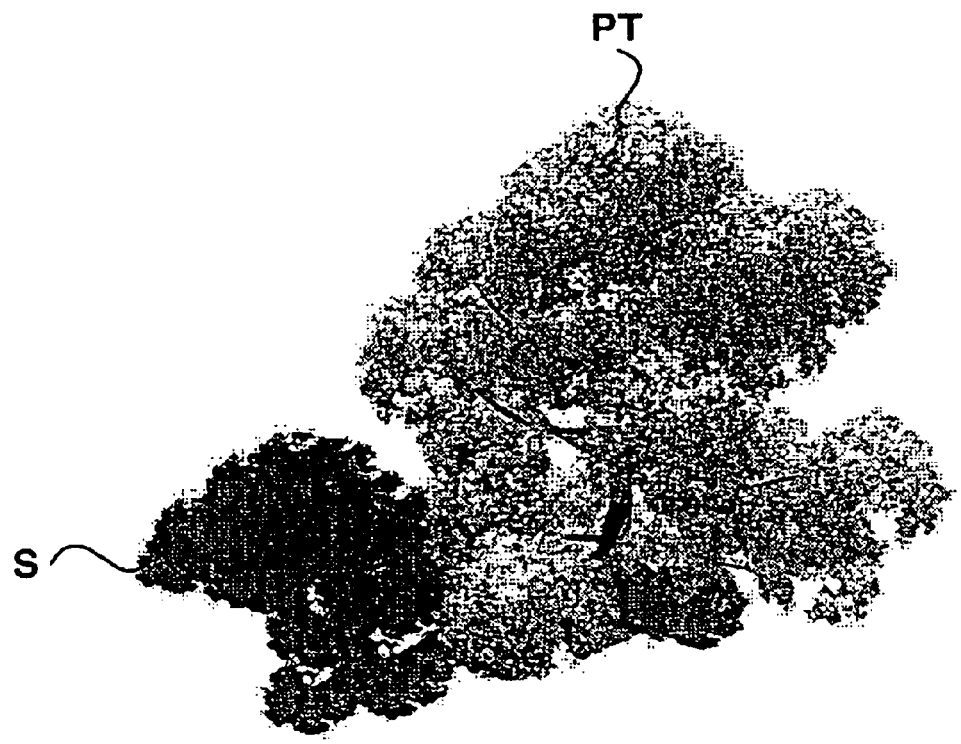
FIG. 22 is an example display (plan) wherein texture has been mapped to a directionally controlled tree object.

FIG. 21 is a wire frame representation when the point of view position is moved above the tree object. FIG. 22 is the same with texture data mapped in.

According to this embodiment aspect, despite the fact that the texture data mapped to the display elements P are identical, it can be confirmed that the semblance of a natural tree can be adequately represented by shadows based on the weighting coefficients and the random deployment.

Figure 23:
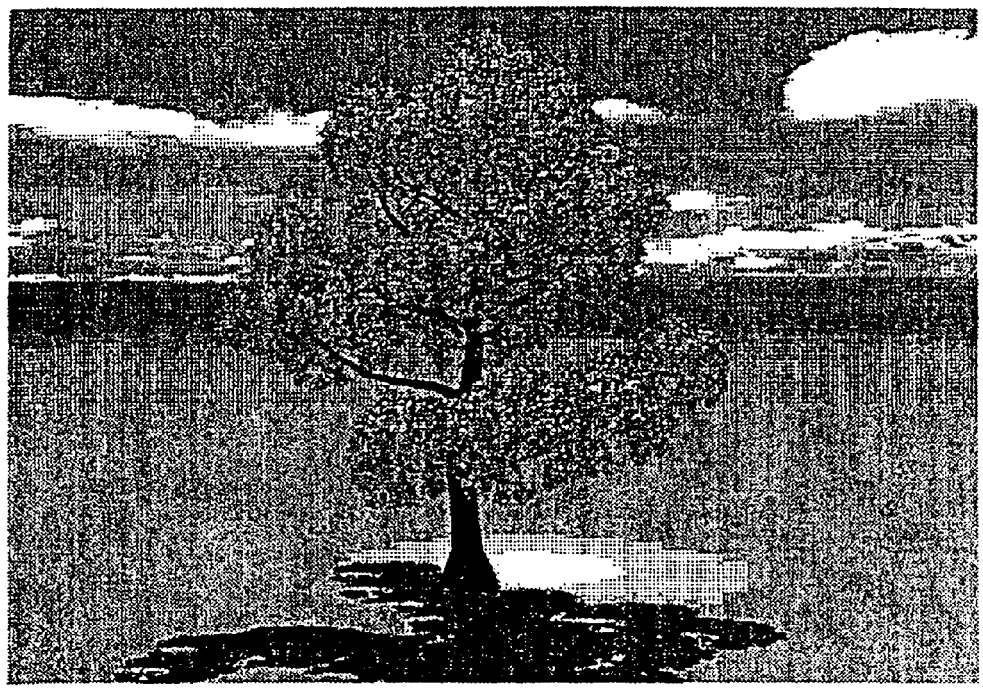
FIG. 23 is an example display of a tree object in a case where display element weighting coefficients are not controlled.

In FIG. 23 is represented, for comparison, a case where the weighting coefficients are set uniformly, that is, a case equivalent to a case where there is no linear interpolation. When linear interpolation is not done, the density variation and light variation are eliminated, resulting in a flat image representation.

Figure 24:
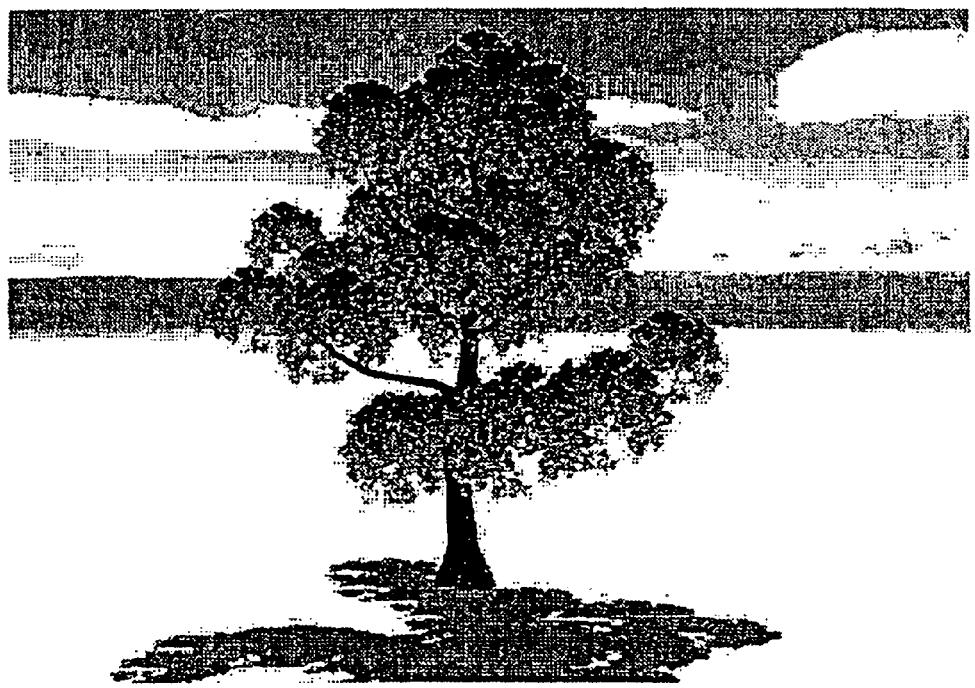
FIG. 24 is an example display of a tree object in a case where displayelement weighting coefficients are altered.

In FIG. 24 is given an image display example in a case where weighting is done assuming that the direction of the environment light is from below (from the ground). It can be confirmed that image displays having a sense of reality can be made even in cases where supernatural images—such as those where the ground is shining—are represented.

(Modification Example)

Figure 25:
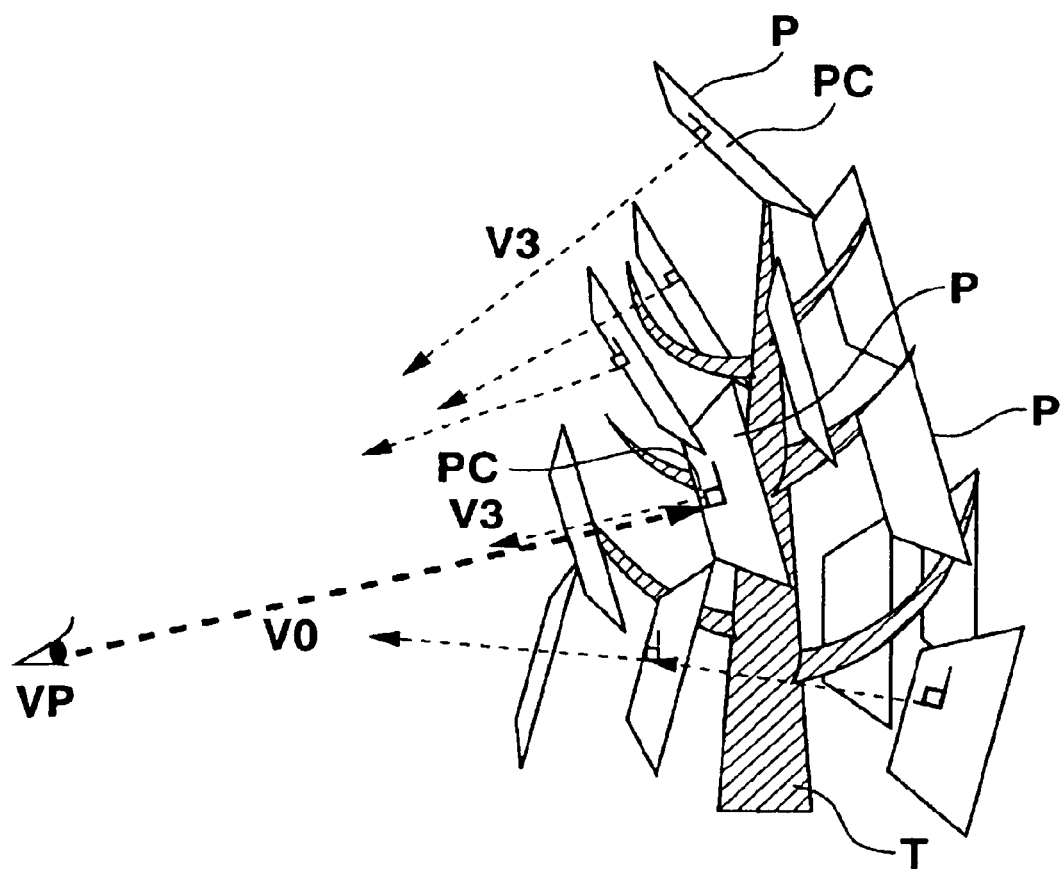
FIG. 25 is a diagram for describing the directional control of display elements by another method in the third embodiment aspect.

In the embodiment aspect described above, one representative point vector V1 is established and all of the display elements P are oriented so as to face in that direction. When surplus computation processing resources are available, however, all of the display elements P may be directionally controlled so as to face in the direction of the point of view VP. That is, as diagrammed in FIG. 25, a plurality of display elements P is directionally controlled so that each of the normal lines V3 in those display elements P is oriented in the direction of the point of view VP. Directional control is effected for all of the display elements P so that the normal lines to their centers of gravity PC are parallel to the line of sight vector V0, without determining a specific display element P.

If Processing such as this is performed, it is possible to naturally represent the semblance of leaves in any pace on a tree, even in cases where the point of view approaches extremely close to the tree object (such as the point of view of a bug crawling on the trunk).

The description of this embodiment aspect relates to the representation of a tree, but the objects to which the present invention can be applied are not limited to trees. It can be applied to all kinds of objects which, because they have complex shapes, require an enormous number of process routines to faithfully reproduce, and which can result in an unnatural display, when approached, if represented with simple texture.

As based on the third embodiment aspect described in the foregoing, benefits are realized in that it is possible to display trees with a natural semblance, even when the point of view approaches extremely close to the tree (or other object), and to avoid impairing the player's sense of realism.

(Fourth Embodiment Aspect)

This embodiment aspect relates to a method that makes it possible to represent natural shadows which do not impair the sense of realism in game machines subject to certain processing power limitations.

The hardware used in this fourth embodiment aspect is the same as that indicated in the first embodiment aspect, so no further description thereof is given here, It is assumed, however, a program and image data, etc., needed to facilitate the representation of shadows in the present invention, are read from the CD-ROM. The operation is now described.

When characters are given shadows in conventional game machines, black objects indicating shadows are deployed beneath the characters. This results in difficulties, however, when the ground is made irregular to make it look like natural terrain. That is, when a character moves across irregular ground, the shadow gets swallowed up by the protruding portions of the ground and so is not displayed.

This embodiment aspect provides a method for imparting shadows that is simple and effective. This method is an image processing method for generating objects for displaying shadows between the point of view and a character.

The image processing method in this embodiment aspect is described with reference to the flowchart given in FIG. 26. This flowchart represents a processing method for generating images of one object.

First, the CPU 101 performs ordinary game sequence processing, determining the position of the object in a new image update time period (S31). For example, as diagrammed in FIG. 27, the ground G which is the reference plane and a character C are configured by polygons, and the deployment of the character C and ground G is determined. Next, a determination is made as to whether or not the object deployed in virtual space is a character (S32), in order to generate the shadow object. If it is not a character (NO in S32), that is if it is an object simulating a stationary form requiring no shadow, processing moves on to an image generation routine involving no shadow (S35).

Figure 28:
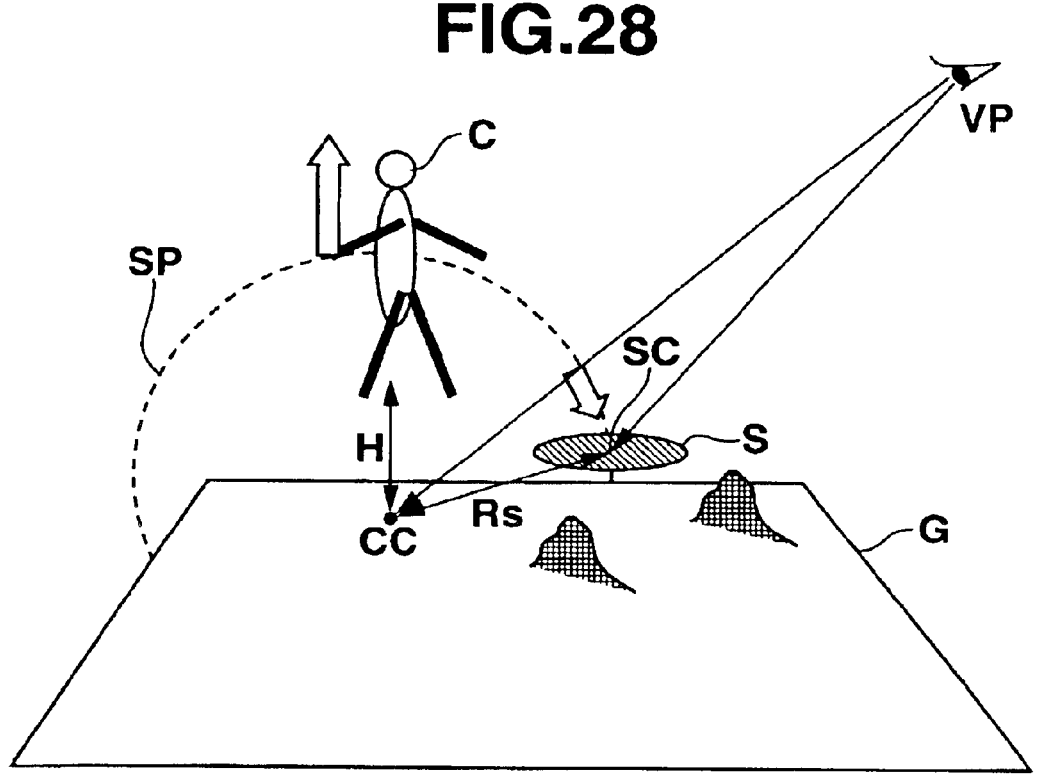
FIG. 28 is a diagram for describing deployment when a character is jumping.

If the object is a character (YES in S32), the elevation of the character is computed (S33). The elevation of the character, as diagrammed in FIG. 27, is judged by the position of the character center CC established under the legs of the character X. In FIG. 27, the character C is walking over the ground G, wherefore the elevation is zero. In FIG. 28, the character C has jumped to a higher position, resulting in an elevation H.

Figure 29:
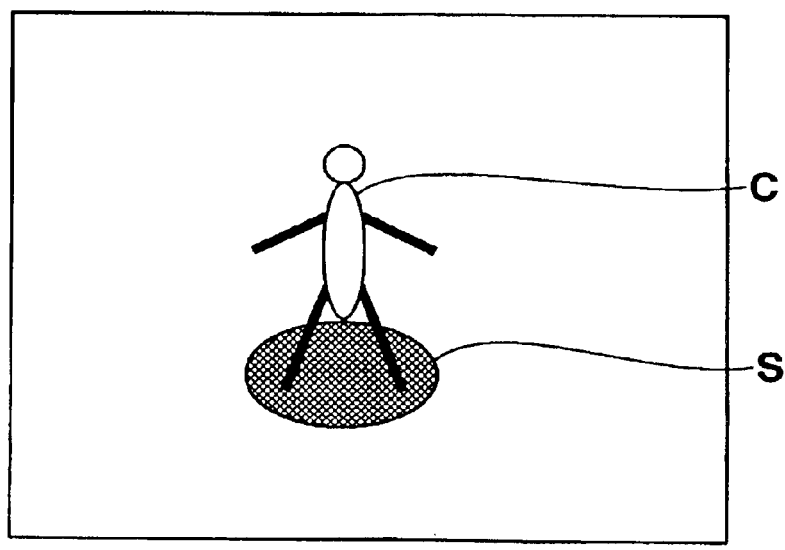
FIG. 29 is an image display model diagram in the deployment diagrammed in FIG. 27.
Figure 31:
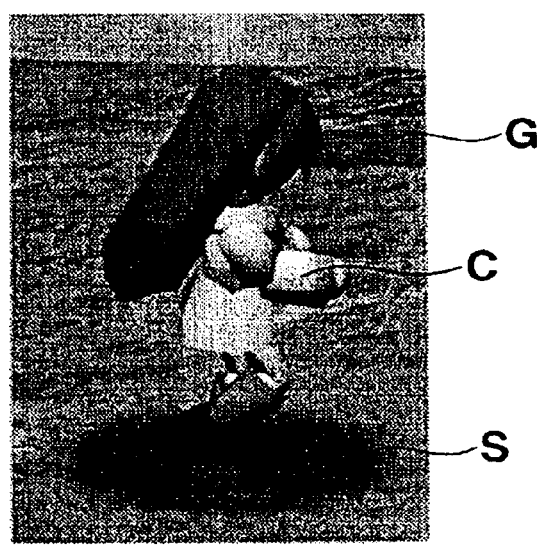
FIG. 31 is an image display example (with point of view diagonally above) in the fourth embodiment aspect.
Figure 32:
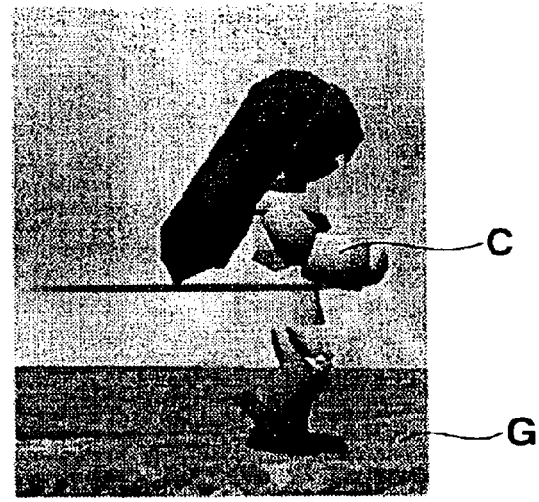
FIG. 32 in an image display example (with point of view at ground level) in the fourth embodiment aspect.

Next, the position of the shadow is determined according to the elevation of the character. When the elevation is zero, as in FIG. 27, for example, the CPU 101 makes settings so that the center SC of the shadow object S is positioned on a line joining the point of view VP and the character center CC. This shadow center SC is made to be positioned on a sphere SP of certain radius Rs from the character center CC, for example. Accordingly, when the point of view VP moves, the position of the shadow center SC will move also, following the surface of the sphere SP. A model diagram of the image display resulting from this deployment is given in FIG. 29 and an example image display is shown in FIG. 31. Because the shadow S is in front of the character C, the display shows the shadow S falling below the legs of the character C, but there is no unnaturalness because the shadow S falls only partially on the legs. When the point of view VP is moved to the same position on the ground G, the plane of the shadow S becomes parallel to the line of sight, so the shadow S disappears.

Figure 30:
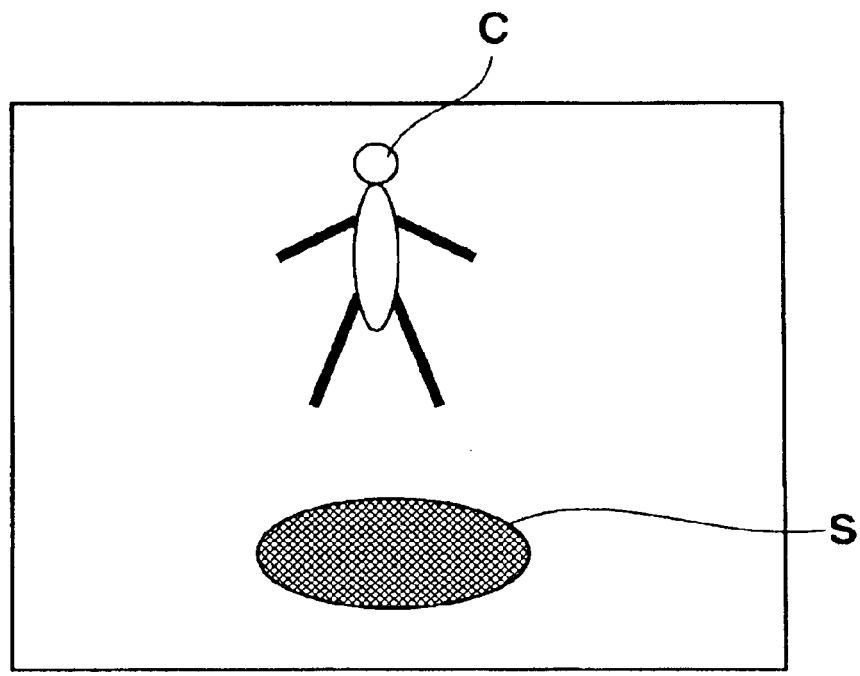
FIG. 30 is an image display model diagram in the deployment diagrammed in FIG. 28.

If the elevation of the character C should not be zero, the shadow moves downward in the virtual space in correspondence with that elevation. More specifically, [the shadows] is moved along the line of intersection between the sphere SP and a plane perpendicular to the ground G containing the line joining the point of view VP and the character center CC. The distance of this movement is made to be proportional to the range, for example. In FIG. 28, for instance, the elevation is H, so the shadow center SC will move in the direction indicated by the white arrow. A model diagram for the image display resulting from this deployment is given in FIG. 30. A natural image is displayed showing the character C jumping up from the ground and the shadow S separating.

As soon as the positional relationship between the character and its shadow has been determined as described above, the CPU 101 performs ordinary image generation processing, mapping texture data to the character and the shadow (S35). Data are mapped to the shadow object S so that it is black with a fuzzy periphery, as shown in FIG. 31, for example.

As based on this embodiment aspect, benefits are realized in that natural shadows can be displayed without increasing the computation load, and without impairing the player's sense of realism.

(Fifth Embodiment Aspect)

This embodiment aspect relates to another method for making it possible to represent the natural shadows in the fourth embodiment aspect described in the foregoing.

The hardware used in this fifth embodiment aspect is the same as that indicated in the first embodiment aspect, so no further description thereof is given here. It is assumed, however, a program and image data, etc., needed to facilitate the representation of shadows in the present invention, are read from the CD-ROM. The operation is now described.

This embodiment aspect provides another method for simply imparting effective shadows. This method is one wherewith illumination light, namely a light source for shining a black light, is established for displaying a shadow in an area for displaying a character shadow.

In order to implement this image processing method, the CPU 101 establishes a light source (black light) for shining black illumination light downward onto the upper part of a character associated so that a shadow is imparted. As diagrammed in FIG. 33, for example, a black light source LP is established above a character C. The character center CC and light source LP are aligned on a line perpendicular to the ground G, for example. In order to represent the time of day when the sun is shining diagonally, however, the position of the light source LP may be moved to a position corresponding to the orientation of the sun at that time. With things set up in that way, the CPU 101 executes rendering processing (shading processing) based on the light source LP. The CPU 101 performs the rendering processing at this time so that the light source LP is only reflected on the polygons configuring the ground G.

Figure 33:
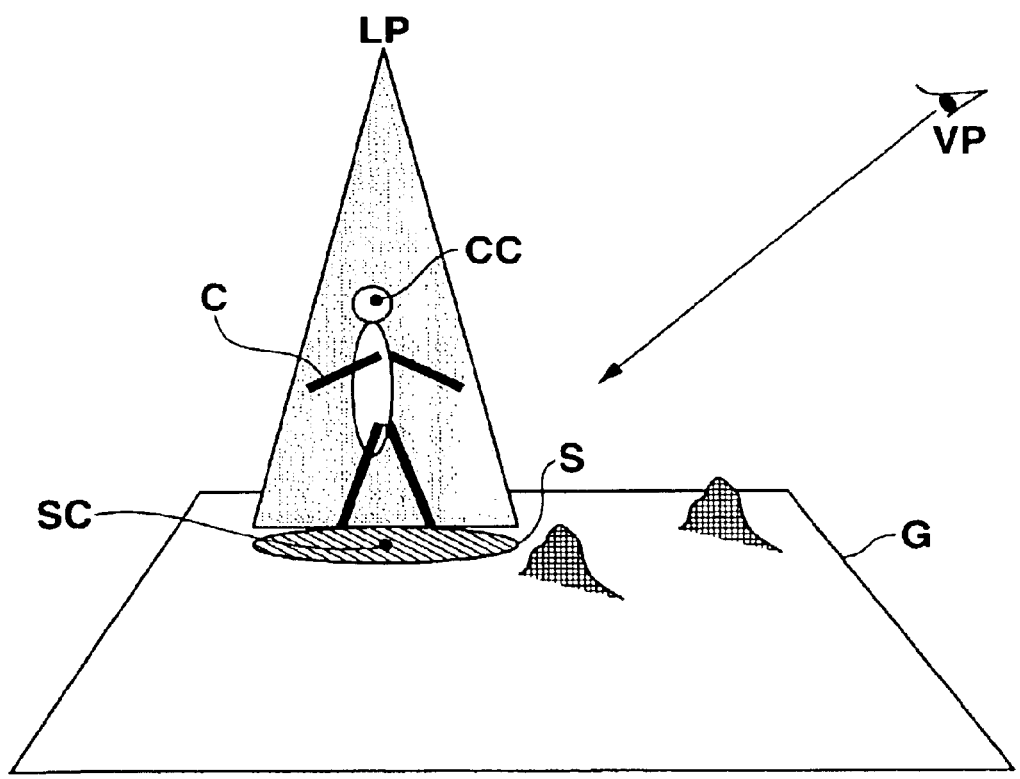
FIG. 33 is a diagram for describing deployment in a fifth embodiment aspect.
Figure 34:
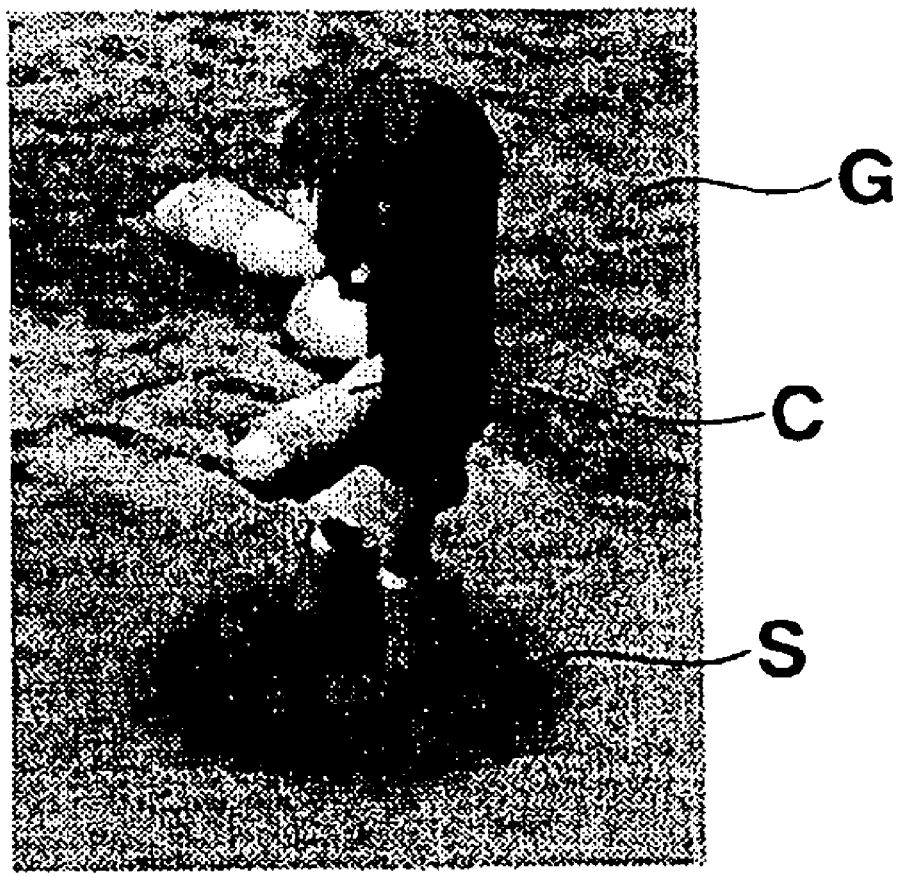
FIG. 34 is an example image display in the fifth embodiment aspect.

Accordingly, as diagrammed in FIG. 33, only that area on the ground G illuminated by the black light from the light source LP is displayed dark, and this is displayed as a shadow S. The shadow center SC will be positioned on a line joining the light source LP with the character center CC. An example of an actual image display is shown in FIG. 34. It will not become dark at the feet of the character C because the shadow S is displayed so as to be reflected only on the ground G. By moving the position of the light source in correspondence with the elevation of the character, moreover, the shadow position can be changed to correspond to the elevation in the same way as with the method of the fourth embodiment aspect described earlier.

As based on this fifth embodiment aspect, benefits are realized in that natural shadows can be displayed without increasing the computation load, and without impairing the player's sense of realism.

(Other Modifications)

The present invention can be modified in various ways irrespective of the modes described in the foregoing. For example, whereas all of the display elements and objects are configured by polygons in the embodiment aspects described in the foregoing, objects may be displayed by other methods that do not use polygons.

In the first embodiment aspect, moreover, the density in sequentially altered when a character enters or leaves a building, but the present invention can be applied when there is a relationship between two objects such that one enters or leaves the other, and is not limited to the relationship between a character and building. The present invention can also be applied when part of an object is made so that it can be seen through in cases unrelated to the entering or exiting of a character.

In the second and third embodiment aspect described in the foregoing, moreover, the present invention is applied to objects such an trees, but the present invention can be provided in cases where an object is displayed that simulates a form existing in the natural world having an irregular feel such as a tree. It is effective in cases where something having an indistinct shape like hair or flames is to be represented with striking realism.

Furthermore, in the first, fourth, and fifth embodiment aspects described in the foregoing, the character is a person, but the model is not limited to persons, and application is possible to animals, robots, and the like, and even to other moving things such as automobiles or aircraft.

INDUSTRIAL APPLICABILITY

Based on the present invention, image display can be provided which facilitates natural display transitions without impairing the sense of realism when a character enters or exits an object.

Based on the present invention, image display can be provided which facilitates the display of trees with natural semblance, even when the trees or other objects are displayed large.

Based on the present invention, image display can be provided which facilitates the display of natural shadows that do not impair the sense of realism, without increasing the computation load.

Based on the present invention, a game machine can be provided wherewith the image processing described above is possible.

Based on the present invention, a recording medium is provided which makes it possible to provide programs wherewith the image processing described above is possible.

What is claimed is:

1. An image processing unit configured to facilitate display of objects deployed in a three-dimensional virtual space, said image processing unit comprising:

a processing unit for deploying a first display element and a plurality of flat display elements having a set of apexes and to which prescribed texture data have been mapped, in a plurality, within a prescribed spatial area to configure one object comprising said first display element and said plurality of flat display elements deployed so as to be scattered about the first display element, and for controlling directions in which faces of said plurality of flat display elements are oriented to correspond with a point of view from which virtual space is observed, wherein said object is configured such that a plurality of weighting coefficients are set to apexes of said flat display elements, a density of texture mapped to said flat display elements can be linearly interpolated by said weighting coefficients between said apexes, one representative point vector is established for said object, corresponding to said point of view, said flat display elements can be directionally controlled so that the plurality of said display elements configuring said object are oriented in a direction of said representative point vector, and the flat elements can be directionally controlled so that each normal line in said plurality of display elements is oriented in the direction of said point of view, wherein by altering said weighting coefficients to correspond to a position of said object in virtual space, a density variation of texture in said flat display elements configuring said object can be controlled, wherein a lighting direction toward the flat display objects is determined based on an environmental light vector of an environmental lighting positioned in the virtual space, and wherein the weighting coefficients nearer toward the environmental lighting have a higher value and those farther from the environmental light source have a lower value.

2. An image processing method for displaying objects deployed in three-dimensional virtual space, comprising:

deploying within a certain spatial area a first display element and a plurality of flat display elements having a set of apexes to which prescribed texture data have been mapped, to configure one object comprising said first display element and said plurality of flat display elements deployed so as to be scattered about the first display element;

establishing one representative point vector for one flat display element corresponding to a point of view from which virtual space is observed;

setting a plurality of weighting coefficients to apexes of said plurality of flat display elements;

controlling directions wherein faces of said plurality of flat display elements are oriented in one of a direction of said representative point vector and wherein each line normal to said plurality of flat display elements is oriented in the direction of said point of view;

linearly interpolating a density of a mapped texture using said weighting coefficients between said apexes; and altering said weighting coefficients to correspond to a position of said object in virtual space to control density variations of texture in said plurality of flat display elements configuring said object, wherein the altering further comprises, determining a lighting direction toward the flat display elements based on an environmental light vector of an environmental lighting positioned in the virtual space, and setting weighting coefficients nearer toward the environmental lighting to a higher value and weighting coefficients farther from the environmental lighting to a lower value.

3. The image processing unit of claim 1, wherein the weighting coefficient set for one of the plurality of flat display elements is set the same for all of the other plurality of flat display elements.

4. The image processing method of claim 2, wherein the weighting coefficient set for one of the plurality of flat display elements is set the same for all of the other plurality of flat display elements.

* * * * *

UNITED STATES PATENT AND TRADEMARK OFFICE
CERTIFICATE OF CORRECTION

PATENT NO. : 6,831,659 B1
DATED : December 14, 2004
INVENTOR(S) : Toshiyuki Mukoyama et al.

It is certified that error appears in the above-identified patent and that said Letters Patent is hereby corrected as shown below:

Title page,
Item [54], Title, "PROCESSOR" should read -- PROCESSING --.

Signed and Sealed this

Tenth Day of May, 2005

JON W. DUDAS
*Director of the United States Patent and Trademark Office*